United States Patent
Sun et al.

(10) Patent No.: US 11,706,771 B2
(45) Date of Patent: Jul. 18, 2023

(54) CONTROL CHANNEL DESIGN FOR SHARED WIRELESS COMMUNICATIONS

(71) Applicant: QUALCOMM Incorporated, San Diego, CA (US)

(72) Inventors: Jing Sun, San Diego, CA (US); Huilin Xu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/799,332

(22) Filed: Feb. 24, 2020

(65) Prior Publication Data
US 2020/0221434 A1 Jul. 9, 2020

Related U.S. Application Data

(63) Continuation of application No. 16/733,176, filed on Jan. 2, 2020.
(Continued)

(51) Int. Cl.
*H04W 72/04* (2009.01)
*H04L 5/00* (2006.01)
(Continued)

(52) U.S. Cl.
CPC .......... *H04W 72/23* (2023.01); *H04L 5/0048* (2013.01); *H04W 16/14* (2013.01)

(58) Field of Classification Search
CPC .... H04W 72/042; H04W 16/14; H04L 5/0048
See application file for complete search history.

(56) References Cited

U.S. PATENT DOCUMENTS 10,356,778 B2 7/2019 Tseng et al.
11,121,836 B2 9/2021 Kwak et al.
(Continued)

FOREIGN PATENT DOCUMENTS

EP 3244678 A1 11/2017

OTHER PUBLICATIONS

Qualcomm Incorporated, "TxOP Frame Structure for NR unlicensed", 3GPP TSG RAN WG1 Meeting #92, Athens, Greece, Feb. 26-Mar. 2, 2018, R1-1802866 (Year: 2018).*
(Continued)

*Primary Examiner* — Joseph A Bednash
(74) *Attorney, Agent, or Firm* — Holland & Hart LLP/Qualcomm Incorporated

(57) ABSTRACT

Methods, systems, and devices for wireless communication are described that may enable a user equipment (UE) to monitor a shared spectrum to receive control signaling and data transmissions associated with different transmission time intervals (TTIs). For example, a base station may communicate with a UE according to a first transmission mode during a first, shortened TTI. The base station may transmit a downlink control channel for a shortened TTI based on a subset of a number of blind decodes or control channel elements. Additionally, a downlink control channel for a shortened TTI may contain grants for multiple TTIs. In some cases, the base station may transmit a signaling to the UE via a reference signal, downlink control channel, or radio resource control which may indicate a change from the shortened-TTI transmission mode to a transmission mode with a TTI duration that is longer than the first, shortened TTI duration.

24 Claims, 17 Drawing Sheets

Related U.S. Application Data

(60) Provisional application No. 62/788,530, filed on Jan. 4, 2019.

(51) Int. Cl.
*H04W 16/14* (2009.01)
*H04W 72/23* (2023.01)

(56) References Cited

U.S. PATENT DOCUMENTS

| | | | |
|---|---|---|---|
| 11,329,856 | B2 | 5/2022 | Takeda et al. |
| 2009/0046605 | A1 | 2/2009 | Gao et al. |
| 2014/0153531 | A1 | 6/2014 | Ko et al. |
| 2016/0128028 | A1 | 5/2016 | Mallik et al. |
| 2016/0164643 | A1 | 6/2016 | Loehr et al. |
| 2016/0301556 | A1* | 10/2016 | Nory ............... H04L 27/2607 |
| 2018/0069653 | A1 | 3/2018 | Fujishiro et al. |
| 2018/0213532 | A1 | 7/2018 | Hosseini et al. |
| 2018/0317225 | A1 | 11/2018 | Akkarakaran et al. |
| 2019/0110279 | A1* | 4/2019 | Behravan ............ H04L 5/0053 |
| 2019/0215888 | A1* | 7/2019 | Cirik ................. H04B 17/318 |
| 2019/0364592 | A1 | 11/2019 | Bhattad et al. |
| 2020/0112978 | A1 | 4/2020 | Zhang et al. |
| 2020/0205195 | A1 | 6/2020 | Sun et al. |
| 2020/0221430 | A1 | 7/2020 | Sun et al. |
| 2020/0351934 | A1 | 11/2020 | Khoshnevisan et al. |
| 2020/0396686 | A1* | 12/2020 | Tiirola ............ H04W 72/1289 |
| 2021/0037478 | A1 | 2/2021 | Yang et al. |
| 2021/0084596 | A1 | 3/2021 | Lee et al. |
| 2021/0084620 | A1* | 3/2021 | Tooher ............. H04W 72/1247 |
| 2021/0092717 | A1 | 3/2021 | Takeda et al. |

OTHER PUBLICATIONS

Ericsson, On DL signals and channels for NR-U, 3GPP TSG RAN WG1 Meeting #94bis, Chengdu, China, Oct. 8-12, 2018, R1-1911299 (Year: 2018).*

Ericsson, "On DL signals and channels for NR-U", 3GPP TSG-RAN WG1 Meeting #94bis, Chengdu, China, Oct. 8-12, 2018, R1-1811299 (Year: 2018).*

MediaTek Inc., "On downlink transmission detection in NR-U", 3GPP TSG RAN Meeting #94, Gothenburg, Sweden, Aug. 20-24, 2018, R1-1808272 (Year: 2018).*

Fujitsu, "Discussion on Flexible Starting Position and Related PDCCH Monitoring for the NR-U", 3GPP TSG RAN WG1 Meeting #93, Busan, Korea, May 21-25, 2018, R1-1806123, (Year: 2018), 3 pages.

Oppo, "Frame structure for NR-U", 3GPP TSG RAN WG1 Meeting #92bis, Sanya, China, Apr. 16-20, 2018, R1-1803973, 3 pages, (Year: 2018).

Ericsson: "On PDCCH Repetition for URLLC", 3GPP TSG RAN Meeting AH 1801, R1-1800963, Vancouver, Canada, Jan. 22-Jan. 26, 2018, (Year: 2018), 3 Pages.

Huawei, et al., "NR Frame Structure on Unlicensed Bands", 3GPP TSG RAN WG1 Adhoc Meeting #92, R1-1800040, Vancouver, Canada, Jan. 22-26, 2018, (Year: 2018), 7 Pages.

Media Tek Inc., "On Frame Structure Design for NR-U Operation", 3GPP TSG RAN WG1 Meeting #94, R1-1808271, Gothenburg, Sweden, Aug. 20-24, 2018, (Year: 2018), 4 Pages.

Xiaomi: "Frame Structure for NR-U", 3GPP Draft, 3GPP TSG RAN WG1 Meeting #95, R1-1813360, Frame Structure for NR-U, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555392, 5 pages, Retrieved from the Internet: URL: http://www.3gpp.org/ftp/Meetings%5F3GPP%5FSYNC/RAN1/Docs/R1%2D1813360%2Ezip. [retrieved on Nov. 11, 2018] Discussion—Bi-directional MCOT; p. 5, paragraph 2.

ZTE: "PDCCH Monitoring for Slots and Mini-Slots", R1-1707162, 3GPP TSG RAN WG1 Meeting #89, Hangzhou, P.R. China, May 15-19, 2017, 4 pages.

Ericsson "On DL Signals and Channels for NR-U", 3GPP TSG-RAN WG1 Meeting #94bis, Chengdu, China, Oct. 8-12, 2018, R1-1811299, (Year: 2018), 6 Pages.

NTT Docomo, Inc: "s(E)PDCCH for Shortened TTI", R1-1612694, 3GPP TSG RAN WG1 Meeting #87, Reno, USA Nov. 14-18, 2016, pp. 1-8.

NTT Docomo, Inc: "sPDCCH for Shortened TTI", R1-167368, 3GPP TSG RAN WG1 Meeting #86, Gothenburg, Sweden Aug. 22-26, 2016, pp. 1-8.

* cited by examiner

CONTROL CHANNEL DESIGN FOR SHARED WIRELESS COMMUNICATIONS

CROSS REFERENCE

The present Application for Patent is a continuation of U.S. patent application Ser. No. 16/733,176 by SUN et al., entitled "CONTROL CHANNEL DESIGN FOR SHARED WIRELESS COMMUNICATIONS," filed Jan. 2, 2020, which claims the benefit of U.S. Provisional Patent Application No. 62/788,530 by SUN et al., entitled "CONTROL CHANNEL DESIGN FOR SHARED WIRELESS COMMUNICATIONS," filed Jan. 4, 2019, each of which is assigned to the assignee hereof and expressly incorporated herein.

BACKGROUND

The following relates generally to wireless communications, and more specifically to control channel design for shared wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station and UE operating in shared or unlicensed spectrum may participate in contention-based access procedures prior to beginning communications (e.g., to determine whether resources are available for communication). After gaining access to resources for communication, a base station and a UE may communicate using varying transmission time intervals (e.g., slots, mini-slots, symbols).

SUMMARY

The described techniques relate to improved methods, systems, devices, and apparatuses that support control channel design for shared wireless communications. Generally, the described techniques provide for enabling a user equipment (UE) to monitor a shared spectrum to receive control signaling and data transmissions associated with different sizes of transmission time intervals (TTIs) (e.g., TTIs of varying durations). For example, a base station and a UE may monitor a channel of a shared radio frequency spectrum band during a listen before talk (LBT) procedure to determine whether communication resources are available. After monitoring determining resources are available, the base station may transmit a downlink control channel to the UE according to a first transmission mode (e.g., a mini-slot transmission mode) during a first TTI (e.g., a shortened TTI (sTTI)). In some examples, the downlink control channel may indicate respective grants for each of a set of TTIs including a second TTI subsequent to the first TTI. Additionally or alternatively, the base station may transmit a signaling to the UE indicating a change from the first transmission mode (e.g., a mini-slot based transmission mode) to a second transmission mode (e.g., slot based transmission mode). In some examples, the signaling indicating a change may be transmitted via a reference signal, a control channel, or a radio resource control (RRC) message, among others, and may indicate the beginning of communications according to the second transmission mode.

A method of wireless communications at a UE is described. The method may include monitoring a shared radio frequency spectrum band for a downlink control channel from a base station during a first TTI according to a first transmission mode, receiving, from the base station, signaling indicating a change from the first transmission mode to a second transmission mode, the first transmission mode associated with a first TTI duration and the second transmission mode associated with a second TTI duration that is longer than the first TTI duration, and monitoring the shared radio frequency spectrum band for the downlink control channel from the base station during a second TTI based on the signaling.

An apparatus for wireless communications at a UE is described. The apparatus may include a processor, memory coupled with the processor, and instructions stored in the memory. The instructions may be executable by the processor to cause the apparatus to monitor a shared radio frequency spectrum band for a downlink control channel from a base station during a first TTI according to a first transmission mode, receive, from the base station, signaling indicating a change from the first transmission mode to a second transmission mode, the first transmission mode associated with a first TTI duration and the second transmission mode associated with a second TTI duration that is longer than the first TTI duration, and monitor the shared radio frequency spectrum band for the downlink control channel from the base station during a second TTI based on the signaling.

Another apparatus for wireless communications at a UE is described. The apparatus may include means for monitoring a shared radio frequency spectrum band for a downlink control channel from a base station during a first TTI according to a first transmission mode, receiving, from the base station, signaling indicating a change from the first transmission mode to a second transmission mode, the first transmission mode associated with a first TTI duration and the second transmission mode associated with a second TTI duration that is longer than the first TTI duration, and monitoring the shared radio frequency spectrum band for the downlink control channel from the base station during a second TTI based on the signaling.

A non-transitory computer-readable medium storing code for wireless communications at a UE is described. The code may include instructions executable by a processor to monitor a shared radio frequency spectrum band for a downlink control channel from a base station during a first TTI according to a first transmission mode, receive, from the base station, signaling indicating a change from the first transmission mode to a second transmission mode, the first transmission mode associated with a first TTI duration and the second transmission mode associated with a second TTI duration that is longer than the first TTI duration, and monitor the shared radio frequency spectrum band for the downlink control channel from the base station during a second TTI based on the signaling.

In some examples of the method, apparatuses, and non-transitory computer-readable medium described herein, receiving the signaling may include operations, features, means, or instructions for receiving a reference signal that indicates a beginning of communications according to the second transmission mode.

Some examples of the method, apparatuses, and non-transitory computer-readable medium described herein may further include operations, features, means, or instructions for monitoring the shared radio frequency spectrum band during a remaining portion of the first TTI based on receiving the reference signal during the first portion of the first TTI.

In some examples of the method, apparatuses, and non-transitory computer-readable medium described herein, the second TTI includes the beginning of communications according to the second transmission mode.

In some examples of the method, apparatuses, and non-transitory computer-readable medium described herein, receiving the signaling may include operations, features, means, or instructions for receiving a physical downlink control channel (PDCCH) from the base station, the PDCCH including a switching indicator that indicates one or more of a beginning of communications according to the second transmission mode or a continuation of communications according to the first transmission mode.

In some examples of the method, apparatuses, and non-transitory computer-readable medium described herein, receiving the signaling may include operations, features, means, or instructions for receiving an RRC message from the base station, the RRC message indicating a fixed number of TTIs for communications according to the first transmission mode before the change from the first transmission mode to the second transmission mode.

Some examples of the method, apparatuses, and non-transitory computer-readable medium described herein may further include operations, features, means, or instructions for identifying a maximum number of blind decodes for the downlink control channel and a maximum number of control channel elements (CCEs) for the downlink control channel, where the maximum total number of blind decodes and the maximum number of CCEs may be distributed among TTIs of the first transmission mode.

Some examples of the method, apparatuses, and non-transitory computer-readable medium described herein may further include operations, features, means, or instructions for receiving the downlink control channel according to the first transmission mode during the first TTI based on a first subset of the maximum number of blind decodes and a first subset of the maximum number of CCEs.

Some examples of the method, apparatuses, and non-transitory computer-readable medium described herein may further include operations, features, means, or instructions for receiving the downlink control channel according to the first transmission mode during the second TTI based on a second subset of the maximum number of blind decodes and a second subset of the maximum number of CCEs.

In some examples of the method, apparatuses, and non-transitory computer-readable medium described herein, the first subset of the maximum number of blind decodes and the second subset of the maximum number of blind decodes may be the same, and the first subset of the maximum number of CCEs and the second subset of the maximum number of CCEs may be the same.

A method of wireless communications at a base station is described. The method may include monitoring a channel of a shared radio frequency spectrum band during an LBT procedure, the channel associated with communications between the base station and a UE, transmitting a downlink control channel to the UE according to a first transmission mode during a first TTI based on the monitoring, and transmitting, to the UE, signaling indicating a change from the first transmission mode to a second transmission mode, the first transmission mode associated with a first TTI duration and the second transmission mode associated with a second TTI duration that is longer than the first TTI duration.

An apparatus for wireless communications at a base station is described. The apparatus may include a processor, memory coupled with the processor, and instructions stored in the memory. The instructions may be executable by the processor to cause the apparatus to monitor a channel of a shared radio frequency spectrum band during a listen before talk procedure, the channel associated with communications between the base station and a UE, transmit a downlink control channel to the UE according to a first transmission mode during a first TTI based on the monitoring, and transmit, to the UE, signaling indicating a change from the first transmission mode to a second transmission mode, the first transmission mode associated with a first TTI duration and the second transmission mode associated with a second TTI duration that is longer than the first TTI duration.

Another apparatus for wireless communications at a base station is described. The apparatus may include means for monitoring a channel of a shared radio frequency spectrum band during a listen before talk procedure, the channel associated with communications between the base station and a UE, transmitting a downlink control channel to the UE according to a first transmission mode during a first TTI based on the monitoring, and transmitting, to the UE, signaling indicating a change from the first transmission mode to a second transmission mode, the first transmission mode associated with a first TTI duration and the second transmission mode associated with a second TTI duration that is longer than the first TTI duration.

A non-transitory computer-readable medium storing code for wireless communications at a base station is described. The code may include instructions executable by a processor to monitor a channel of a shared radio frequency spectrum band during a listen before talk procedure, the channel associated with communications between the base station and a UE, transmit a downlink control channel to the UE according to a first transmission mode during a first TTI based on the monitoring, and transmit, to the UE, signaling indicating a change from the first transmission mode to a second transmission mode, the first transmission mode associated with a first TTI duration and the second transmission mode associated with a second TTI duration that is longer than the first TTI duration.

In some examples of the method, apparatuses, and non-transitory computer-readable medium described herein, transmitting the signaling may include operations, features, means, or instructions for transmitting a reference signal that indicates a beginning of communications according to the second transmission mode.

Some examples of the method, apparatuses, and non-transitory computer-readable medium described herein may further include operations, features, means, or instructions for transmitting the reference signal during a first portion of the first TTI, and transmitting a single downlink control channel during a remaining portion of the first TTI based on transmitting the reference signal during the first portion of the first TTI.

In some examples of the method, apparatuses, and non-transitory computer-readable medium described herein, a second TTI subsequent the first TTI includes the beginning of communications according to the second transmission mode.

In some examples of the method, apparatuses, and non-transitory computer-readable medium described herein, transmitting the signaling may include operations, features, means, or instructions for transmitting a PDCCH to the UE, the PDCCH including a switching indicator that indicates one or more of a beginning of communications according to the second transmission mode or a continuation of communications according to the first transmission mode.

In some examples of the method, apparatuses, and non-transitory computer-readable medium described herein, transmitting the signaling may include operations, features, means, or instructions for transmitting an RRC message to the UE, the RRC message indicating a fixed number of TTIs for communications according to the first transmission mode before the change from the first transmission mode to the second transmission mode.

Some examples of the method, apparatuses, and non-transitory computer-readable medium described herein may further include operations, features, means, or instructions for identifying a maximum number of blind decodes for the downlink control channel and a maximum number of CCEs for the downlink control channel, where the maximum number of blind decodes and the maximum number of CCEs may be distributed among TTIs of the first transmission mode.

Some examples of the method, apparatuses, and non-transitory computer-readable medium described herein may further include operations, features, means, or instructions for transmitting the downlink control channel according to the first transmission mode during the first TTI based on a first subset of the maximum number of blind decodes and a first subset of the maximum number of CCEs.

Some examples of the method, apparatuses, and non-transitory computer-readable medium described herein may further include operations, features, means, or instructions for transmitting the downlink control channel according to the first transmission mode during a second TTI subsequent the first TTI based on a second subset of the maximum number of blind decodes and a second subset of the maximum number of CCEs.

In some examples of the method, apparatuses, and non-transitory computer-readable medium described herein, the first subset of the maximum number of blind decodes and the second subset of the maximum number of blind decodes may be the same, and the first subset of the maximum number of CCEs and the second subset of the maximum number of CCEs may be the same.

A method of wireless communications at a UE is described. The method may include monitoring a shared radio frequency spectrum band for a downlink control channel from a base station during a first TTI, receiving the downlink control channel from the base station during the first TTI based on the monitoring, the downlink control channel indicating respective grants for each of a set of TTIs including a second TTI subsequent the first TTI, and receiving one or more downlink data transmissions over the set of TTIs in accordance with the respective grants.

An apparatus for wireless communications at a UE is described. The apparatus may include a processor, memory coupled with the processor, and instructions stored in the memory. The instructions may be executable by the processor to cause the apparatus to monitor a shared radio frequency spectrum band for a downlink control channel from a base station during a first TTI, receive the downlink control channel from the base station during the first TTI based on the monitoring, the downlink control channel indicating respective grants for each of a set of TTIs including a second TTI subsequent the first TTI, and receive one or more downlink data transmissions over the set of TTIs in accordance with the respective grants.

Another apparatus for wireless communications at a UE is described. The apparatus may include means for monitoring a shared radio frequency spectrum band for a downlink control channel from a base station during a first TTI, receiving the downlink control channel from the base station during the first TTI based on the monitoring, the downlink control channel indicating respective grants for each of a set of TTIs including a second TTI subsequent the first TTI, and receiving one or more downlink data transmissions over the set of TTIs in accordance with the respective grants.

A non-transitory computer-readable medium storing code for wireless communications at a UE is described. The code may include instructions executable by a processor to monitor a shared radio frequency spectrum band for a downlink control channel from a base station during a first TTI, receive the downlink control channel from the base station during the first TTI based on the monitoring, the downlink control channel indicating respective grants for each of a set of TTIs including a second TTI subsequent the first TTI, and receive one or more downlink data transmissions over the set of TTIs in accordance with the respective grants.

Some examples of the method, apparatuses, and non-transitory computer-readable medium described herein may further include operations, features, means, or instructions for receiving the downlink control channel in a shared data portion of the first TTI.

Some examples of the method, apparatuses, and non-transitory computer-readable medium described herein may further include operations, features, means, or instructions for receiving the downlink control channel before a shared data portion of the second TTI subsequent the first TTI.

Some examples of the method, apparatuses, and non-transitory computer-readable medium described herein may further include operations, features, means, or instructions for determining the set of TTIs based on the monitoring, where the set of TTIs includes TTIs excluding the first TTI.

Some examples of the method, apparatuses, and non-transitory computer-readable medium described herein may further include operations, features, means, or instructions for identifying a maximum number of blind decodes for the downlink control channel and a maximum number of CCEs for the downlink control channel, where the downlink control channel may be received based on the maximum number of blind decodes and the maximum number of CCEs.

In some examples of the method, apparatuses, and non-transitory computer-readable medium described herein, the maximum number of blind decodes and the maximum number of CCEs may be based on a number of TTIs of the set of TTIs.

A method of wireless communications is described. The method may include monitoring a channel of a shared radio frequency spectrum band during an LBT procedure, the channel associated with communications between a base station and a UE, transmitting a downlink control channel to the UE during a first TTI based on the monitoring, the downlink control channel indicating respective grants for each of a set of TTIs including a second TTI subsequent the first TTI, and transmitting one or more downlink data transmissions to the UE over the set of TTIs in accordance with the respective grants.

An apparatus for wireless communications is described. The apparatus may include a processor, memory coupled with the processor, and instructions stored in the memory. The instructions may be executable by the processor to cause the apparatus to monitor a channel of a shared radio frequency spectrum band during a listen before talk procedure, the channel associated with communications between a base station and a UE, transmit a downlink control channel to the UE during a first TTI based on the monitoring, the downlink control channel indicating respective grants for each of a set of TTIs including a second TTI subsequent the first TTI, and transmit one or more downlink data transmissions to the UE over the set of TTIs in accordance with the respective grants.

Another apparatus for wireless communications is described. The apparatus may include means for monitoring a channel of a shared radio frequency spectrum band during a listen before talk procedure, the channel associated with communications between a base station and a UE, transmitting a downlink control channel to the UE during a first TTI based on the monitoring, the downlink control channel indicating respective grants for each of a set of TTIs including a second TTI subsequent the first TTI, and transmitting one or more downlink data transmissions to the UE over the set of TTIs in accordance with the respective grants.

A non-transitory computer-readable medium storing code for wireless communications is described. The code may include instructions executable by a processor to monitor a channel of a shared radio frequency spectrum band during a listen before talk procedure, the channel associated with communications between a base station and a UE, transmit a downlink control channel to the UE during a first TTI based on the monitoring, the downlink control channel indicating respective grants for each of a set of TTIs including a second TTI subsequent the first TTI, and transmit one or more downlink data transmissions to the UE over the set of TTIs in accordance with the respective grants.

Some examples of the method, apparatuses, and non-transitory computer-readable medium described herein may further include operations, features, means, or instructions for transmitting the downlink control channel in a shared data portion of the first TTI.

Some examples of the method, apparatuses, and non-transitory computer-readable medium described herein may further include operations, features, means, or instructions for transmitting the downlink control channel before a shared data portion of the second TTI subsequent the first TTI.

Some examples of the method, apparatuses, and non-transitory computer-readable medium described herein may further include operations, features, means, or instructions for determining the set of TTIs based on the monitoring, where the set of TTIs includes TTIs excluding the first TTI.

Some examples of the method, apparatuses, and non-transitory computer-readable medium described herein may further include operations, features, means, or instructions for identifying a maximum number of blind decodes for the downlink control channel and a set of CCEs for the downlink control channel, where the downlink control channel may be transmitted based on the maximum number of blind decodes and the set of CCEs.

In some examples of the method, apparatuses, and non-transitory computer-readable medium described herein, the maximum number of blind decodes and the set of CCEs may be based on a number of TTIs of the set of TTIs.

Some examples of the method, apparatuses, and non-transitory computer-readable medium described herein may further include operations, features, means, or instructions for transmitting the downlink control channel via a first subset of the CCEs during the first TTI, and transmitting the downlink control channel via a second subset of the CCEs during the second TTI.

DETAILED DESCRIPTION

Figure 1:
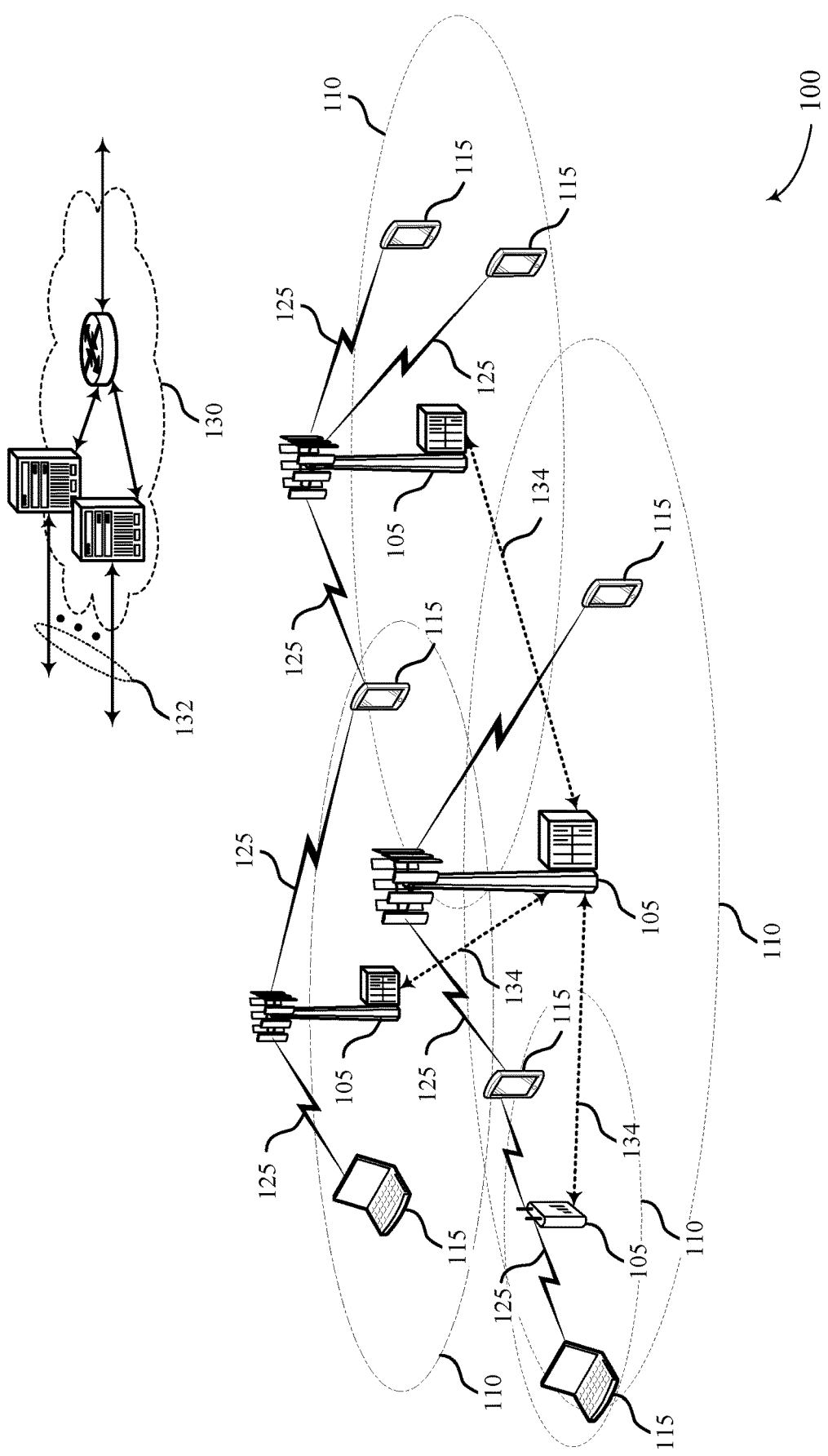
FIG. 1 illustrates an example of a wireless communications system that supports control channel design for shared wireless communications in accordance with aspects of the present disclosure.

Wireless communications devices operating in shared or unlicensed spectrum on a New Radio (NR) network may use contention-based procedures to begin communications using the shared or unlicensed spectrum. For example, a base station may employ a listen before talk (LBT) procedure to determine whether a set of resources is available for transmission. Following a successful contention-based procedure (e.g., LBT), a base station may utilize transmission time intervals (TTIs) of varying durations (slots, mini-slots, symbols, etc.) to begin transmissions to a user equipment (UE). In some cases, the use of shortened TTIs (sTTIs) may allow a base station to avoid wasting time-frequency resources between the point the communications pass the contention-based procedure and the point at which a next slot begins. In some examples, mini-slot based transmissions may continue up until a given slot boundary, where a base station may switch to slot-based transmissions. In some cases, the base station may choose when to switch to slot-based transmissions based on the capabilities of the base station (e.g., data preparation capabilities). For example, a base station may wait a number of slots after passing the contention-based procedure to switch to slot-based transmissions.

In order to switch between transmission types (e.g., between mini-slot based and slot-based transmissions), a base station may notify a UE when the switch is to occur. For example, a base station may send a dedicated physical layer signal (e.g., a reference signal) to a UE as part of the mini-slot based transmissions. In some cases, the dedicated signal may include information as to when the switch is to occur (e.g., the next slot is to be a slot-based transmission). Additionally or alternatively, the dedicated signal may include a notification that the remainder of the slot following the signal is no longer to be split into mini-slots and the portion of the slot following the dedicated signal may be taken up by one mini-slot (e.g., instead of multiple mini-slots), followed by a slot at the next slot boundary. In other examples, a base station may include information regarding the switch to slot-based transmissions as part of a physical downlink control channel (PDCCH) associated with the mini-slot or slot-based transmissions. For example, a UE may decode a PDCCH associated with mini-slot based transmissions and obtain the timing of the switch to slot-based transmissions.

Additionally or alternatively, a base station and a UE may have implicit understanding of when to make the switch to slot-based transmissions. In some cases, a base station and a UE may be configured (e.g., via radio resource control (RRC) signaling or as part of a standard) to determine how long to transmit or receive mini-slot based transmissions. For example, a base station and a UE may be configured such that after the first mini-slot based transmission, the base station and UE are to communicate according to a given number of slots or mini-slots until slot-based transmissions begin.

In some examples, a UE may be limited to a number (e.g., a total or maximum number) of blind decodes or control channel elements (CCEs) a UE is to process on the PDCCH associated with mini-slot based transmissions. In some cases, the limit associated with a PDCCH of one mini-slot may be a subset of the limit associated with the PDCCH of one slot. For example, the limit of blind decodes or CCEs for a slot may be equally split among mini-slots occupying the same time frame as the slot. Additionally or alternatively, the per slot limit of blind decodes or CCEs for a UE to decode may be split among mini-slots proportional to a number of symbols each mini-slot occupies in comparison to the number of symbols the slot occupies.

In some cases, the PDCCH associated with mini-slot based transmissions may be a multi-grant PDCCH, where the multi-grant PDCCH may carry grant information pertaining to one or more mini-slots. For example, a UE may decode a multi-grant PDCCH and obtain grants for all mini-slots in a given slot. Additionally or alternatively, a UE may decode a multi-grant PDCCH and obtain grant information for a number of mini-slots which may extend past a slot boundary and into a subsequent slot. In some cases, a UE may determine not to decode further PDCCH instances for mini-slot transmissions after decoding a first PDCCH (e.g., because the PDCCH may contain grants for all following mini-slots).

Aspects of the disclosure are initially described in the context of wireless communications systems. Aspects of the disclosure are further illustrated by and described with reference to resource schedules, a process flow, apparatus diagrams, system diagrams, and flowcharts that relate to control channel design for shared wireless communications.

FIG. 1 illustrates an example of a wireless communications system 100 that supports control channel design for shared wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal received by the UE 115 with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of sTTIs or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications devices operating in shared or unlicensed spectrum on an NR network may use contention-based procedures to begin communications on the shared or unlicensed spectrum. For example, a base station 105 may employ an LBT mechanism to monitor a wireless channel and determine whether the base station has gained access to the channel. Following a successful contention-based procedure (e.g., LBT), a base station 105 may begin a transmission opportunity and communicate with a UE 115. In some cases, at a beginning of communications, a base station 105 may immediately schedule transmission in a partial slot that may be available before the next slot boundary. In some examples, slots may be pre-configured with a number of concatenated mini-slots which may be used for communications in the partial slot, and a base station 105 may use these mini-slots to begin communications with a UE 115.

Additionally, a gap between the end of the contention-based procedure and the beginning of an available mini-slot may be filled with a filler signal or filler energy to hold the wireless channel for communications between the base station 105 and the UE 115. In some examples, mini-slot transmissions may continue up until a given slot boundary, where the base station 105 may switch to slot-based transmissions. In some cases, a base station 105 may provide a PDCCH configuration for both mini-slot and slot-based transmissions, which a UE 115 may monitor for a grant for the respective transmissions. The base station 105 may switch to slot-based transmissions in order to reduce overhead due to additional PDCCH monitoring occasions for mini-slots. Therefore, a base station 105 may switch to slot-based transmissions as soon as the base station can prepare the resources for transmission.

In some cases, a base station 105 may be unaware of when a contention-based procedure may pass, and may therefore prepare data spanning an entire slot or mini-slot as well as corresponding grants (e.g., via PDCCH). In some examples, a base station 105 may have to cancel prepared data if the contention-based procedure does not pass before the slot or mini-slot containing the prepared data. As such, a base station 105 may postpone some data it has prepared, and may be unable to postpone the data to an immediately subsequent slot or mini-slot (e.g., due to latency involved in data preparation in both physical layers and higher layers). Therefore, a base station 105 may reschedule canceled data to a future mini-slot or slot transmission, based on the capabilities of the base station 105 (e.g., data preparation capabilities). A UE 115 may be unaware of when a contention-based procedure may pass and may therefore monitor for a grant at a control region corresponding to each mini-slot in the resources used for communication with a base station 105. In some examples, a UE 115 may also be unaware of when the switch from mini-slot transmissions to slot-based transmissions is to occur, and a base station 105 may therefore signal a UE 115 with information regarding when the switch is to occur.

In order to switch between transmission types (e.g., mini-slot based and slot-based transmissions), a base station 105 may notify a UE 115 when the switch from mini-slot based transmissions (e.g., a first transmission mode) to slot-based transmissions (e.g., a second transmission mode) is to occur. For example, a base station may send a dedicated signal (e.g., a reference signal) to a UE as part of mini-slot based transmissions. In other examples, a base station 105 may include information regarding the switch to slot-based transmissions as part of a PDCCH associated with the mini-slot or slot-based transmissions. In some cases, a PDCCH associated with mini-slot transmissions may have a limit of blind decodes or CCEs for the UE to process, where the limit is based on the size of a given mini-slot compared to the size of a slot. In some examples, a PDCCH associated with mini-slot based transmissions may be a multi-grant PDCCH and may carry grant information regarding one or more mini-slots. Additionally or alternatively, a base station 105 and a UE 115 may be configured to implicitly determine when the switch from mini-slot based to slot-based transmissions is to occur.

Figure 2:
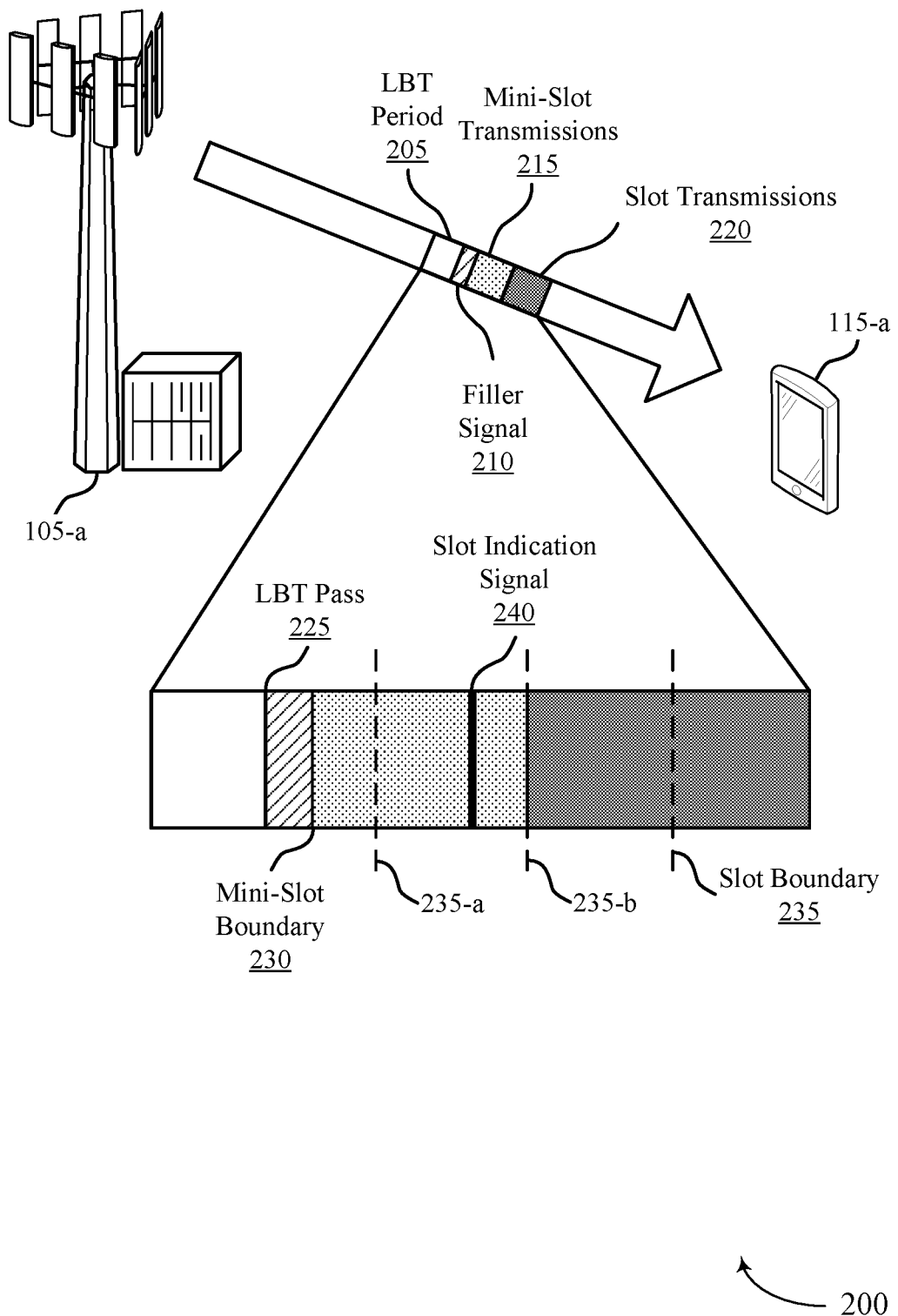
FIG. 2 illustrates an example of a wireless communications system that supports control channel design for shared wireless communications in accordance with aspects of the present disclosure.

FIG. 2 illustrates an example of a wireless communications system 200 that supports control channel design for shared wireless communications in accordance with aspects of the present disclosure. In some examples, wireless communications system 200 may implement aspects of wireless communication system 100 and may include a UE 115-a and a base station 105-a, which may be examples of a UE 115 and a base station 105 described with reference to FIG. 1. UE 115-a and base station 105-a may communicate using a shared spectrum (e.g., unlicensed spectrum). In some cases, UE 115-a and base station 105-a may employ a contention-based access procedure (e.g., LBT procedure) to begin communications, after which the devices may communicate using sTTIs (e.g., mini-slots). Additionally, after communicating using mini-slots for a given time period, base station 105-a and UE 115-a may switch to slot-based communications.

For example, base station 105-a and UE 115-a may communicate with each other using a shared (e.g., unlicensed) spectrum, and base station 105-a may employ an LBT procedure to begin communications with UE 115-a using a channel of the shared spectrum. In some cases, the LBT procedure may include an LBT period 205, where base station 105-a may monitor for open or unused resources. In some examples, base station 105-a may detect an LBT pass 225 by determining that no other signals currently occupy the resources the base station is monitoring. Base station 105-a may then transmit a filler signal 210 to UE 115-a in order to hold the resources for transmission until the next mini-slot boundary 230, where base station 105-a may begin mini-slot transmissions 215. In some cases, mini-slot transmissions 215 may span less than one slot and may terminate at a first slot boundary 235-a. Additionally or alternatively, mini-slot transmissions 215 may span more than one slot and may terminate at a later slot boundary 235 (e.g., slot boundary 235-b). In some examples, a duration of mini-slot transmissions may be based on capabilities of base station 105-a (e.g., data preparation, latency, etc.).

In some cases, base station 105-a may indicate an end of mini-slot transmissions 215 (e.g., a first transmission mode) and a beginning of slot transmissions 220 (e.g., a second transmission mode) using a TTI-specific control signal (e.g., slot indication signal 240). In some examples, slot indication signal 240 may be a dedicated signal transmitted within mini-slot transmissions 215. In other examples, base station 105-a may include slot indication signal 240 as part of PDCCH transmissions to UE 115-a. Additionally or alternatively, wireless communications system 200 may employ a configuration (e.g., RRC configuration) in which base station 105-a and UE 115-a determine a total amount of mini-slot transmissions 215 to be used for communications after an LBT pass and before switching to slot transmissions 220 (e.g., during each transmission opportunity).

According to some aspects, base station 105-a may transmit a slot indication signal 240 any time previous to the beginning of slot transmissions 220 (e.g., as a part of mini-slot transmissions 215). Slot indication signal 240 may indicate a specific point at which slot transmissions 220 are to begin. Additionally or alternatively, base station 105-a may transmit slot indication signal 240 as an initial slot-based signal, indicating the beginning of slot transmissions 220. As such, if UE 115-a were to receive slot indication signal 240 in the middle of a slot, the signal may indicate a remainder of the slot is no longer to be partitioned into mini-slots. Additionally or alternatively, reception of slot indication signal 240 may indicate that base station 105-a is to transmit the subsequent slot using slot transmissions 220, where the remainder of the current slot may be partitioned into mini-slots. In some examples, base station 105-a may use any physical layer signal (e.g., a reference signal) as the dedicated slot indication signal 240.

In one example of a configuration (e.g., RRC configuration) indicating the amount of mini-slot transmissions 215, base station 105-a and UE 115-a may be previously configured (e.g., via RRC signaling or as part of a communications standard) to determine the amount of mini-slot transmissions 215 after communications begin. For example, after detecting the first mini-slot based transmission, UE 115-a may determine that base station 105-a is to transmit a specified number of mini-slots or slots (e.g., a configurable timer) before switching to slot transmissions 220. In some cases, the number of mini-slots or slots before switching to slot transmissions 220 may be zero. In some cases, UE 115-a may restart the timer (e.g., may count another specified number of slots or mini-slots) if UE 115-a receives a PDCCH from base station 105-a before an end of the timer (e.g., before an end of the specified number of slots or mini-slots).

In another example, base station 105-a may transmit slot indication signal 240 as a mode switching indicator in a PDCCH associated with mini-slot transmissions 215 or with slot transmissions 220. As such, UE 115-a may decode the PDCCH to discover when slot transmissions 220 are to begin. For example, base station 105-a may include slot indication signal 240 as a binary mode switching indicator in a PDCCH. In some cases, the indicator may be a "1", which may indicate that base station 105-a has stopped mini-slot transmissions 215 and an entire next slot is to be occupied by slot transmissions 220. In other cases, the indicator may be a "0", which may indicate that base station 105-a is still using mini-slot transmissions 215. In some examples, the function of these binary indicators may be reversed.

In some cases, base station 105-a may transmit multiple grants (e.g., for multiple UEs 115) corresponding to mini-slot transmissions 215 using a PDCCH in the same control region. In some examples, the multiple grants may be carried by one PDCCH associated with mini-slot transmissions 215 (e.g., as a multi-grant PDCCH), where the multi-grant PDCCH may contain grant information for one or more mini-slots within mini-slot transmissions 215. In some cases, base station 105-a may transmit a multi-grant PDCCH before a corresponding physical downlink shared channel (PDSCH) (e.g., at an end of a previous PDSCH). Additionally or alternatively, base station 105-a may transmit a PDCCH together with the corresponding PDSCH (e.g., within a first mini-slot). In some cases, base station 105-a may transmit a multi-grant PDCCH once after LBT pass 225, where the PDCCH may contain multiple grants for multiple PDSCH transmissions in mini-slot transmissions 215. In some examples, a multi-grant PDCCH may contain grant information for contiguous or non-contiguous mini-slots within mini-slot transmissions 215. In some cases, a multi-grant PDCCH may carry a grant for all mini-slots in a remainder of a slot after LBT pass 225 (e.g., for mini-slot transmissions 215 up to slot boundary 235-a). Additionally or alternatively, a multi-grant PDCCH may carry grant information for a number of mini-slots that may extend to a subsequent slot (e.g., for mini-slot transmissions 215 up to and past slot boundary 235-a).

In some cases, a PDCCH associated with slot transmissions 220 or mini-slot transmissions 215 may correspond to a respective control monitoring pattern of a per slot limit of blind decodes or CCEs for UE 115-a to process. In some cases, UE 115-a may be configured to follow a pattern that splits the limit of CCEs or blind decodes across a group of mini-slots within a slot, based on a comparative size of the mini-slot and the slot. In some examples, UE 115-a may portion the per slot limit by splitting the limit equally among mini-slots within the slot. Additionally or alternatively, UE 115-a may split the per slot limit among mini-slots in proportion to a number of symbols allocated to each mini-slot, compared to a number of symbols allocated to the entire slot. In the case where mini-slot scheduling may end before a last mini-slot of the slot, the remainder of any blind decode or CCE limit may be allocated to a remaining portion of the slot.

Figure 3:
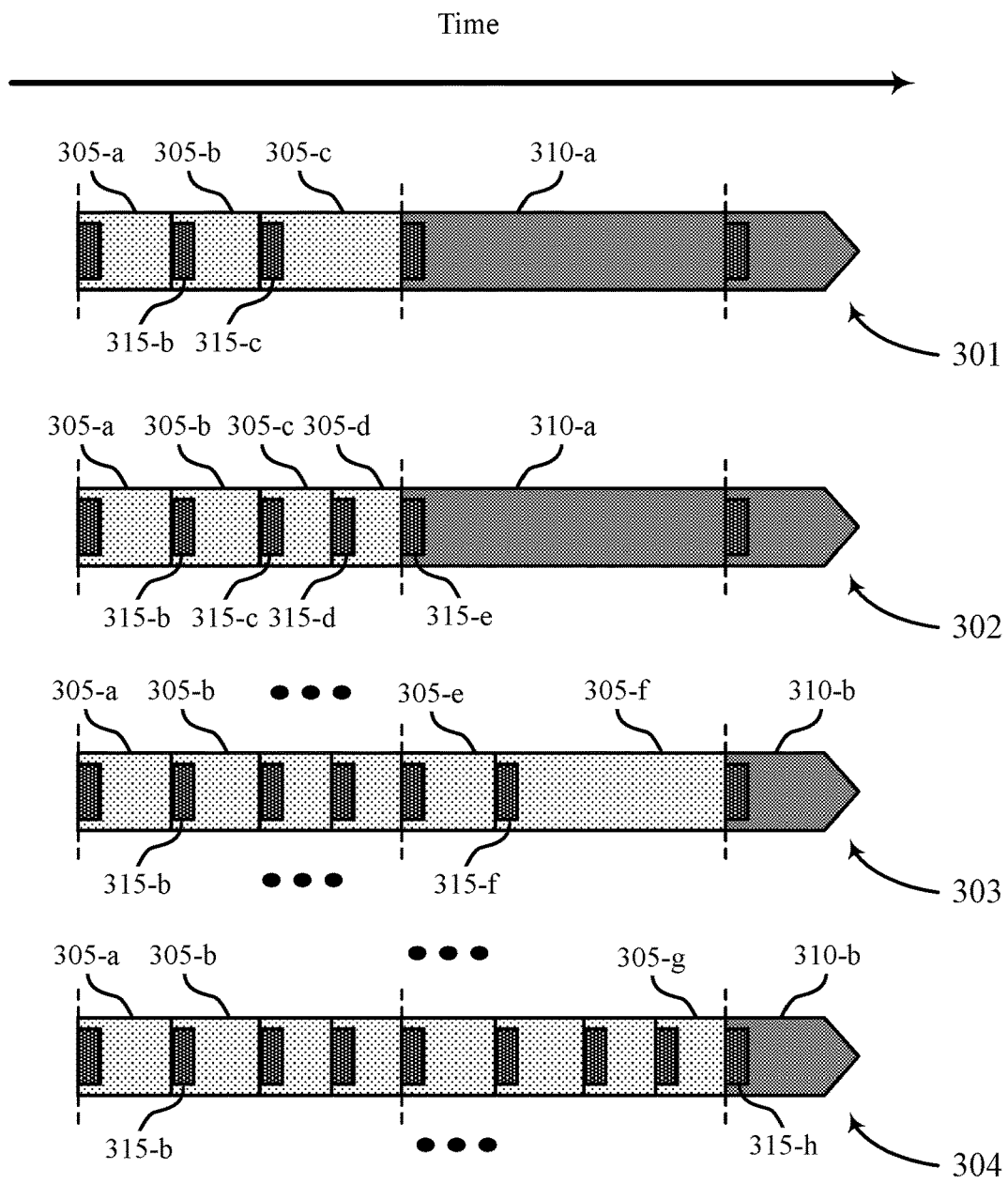
FIGS. 3 and 4 illustrate examples of resource schedules that support control channel design for shared wireless communications in accordance with aspects of the present disclosure.

FIG. 3 illustrates examples of resource schedules 301, 302, 303, and 304 that support control channel design for shared wireless communications in accordance with aspects of the present disclosure. In some examples, resource schedules 301, 302, 303, and 304 may implement aspects of wireless communications systems 100 or 200. A resource schedule 300 (e.g., one of resource schedules 301, 302, 303, and 304) may include communications transmitted by a base station 105, which may be an example of a base station 105 described with reference to FIGS. 1 and 2. Additionally, a UE 115 may receive the communications transmitted by the base station 105, which UE may be an example of a UE 115 described with reference to FIGS. 1 and 2.

As mentioned above with reference to FIGS. 1 and 2, the base station 105 may perform a contention-based access procedure (e.g., LBT) to gain access to shared network resources (e.g., unlicensed spectrum), following which the base station 105 may begin transmissions to the UE 115 using shortened-TTI (e.g., mini-slot) resources. In some cases, the base station 105 may prepare a resource schedule 300 before passing the LBT procedure. For example, the base station 105 may prepare mini-slots 305 for communications that are to take place with the UE 115 following an LBT pass. However, in some cases, neither the base station 105 nor the UE 115 may be aware of when the LBT pass may occur. Therefore, the base station 105 may modify resource schedule 300, where the modification may be based on capabilities of the base station 105.

For example, the LBT pass may occur within a first mini-slot 305-a prepared for transmission, and the base station 105 may have prepared a resource schedule similar to resource schedule 302. As such, the base station 105 may not transmit data in mini-slot 305-a and may cancel and reschedule the data for a future mini-slot 305 or a future slot 310. In some cases, the base station 105 may implement resource schedule 301 (e.g., based on the capabilities of the base station 105), where the base station 105 may reschedule data from mini-slot 305-a into mini-slot 305-b, mini-slot 305-c, or slot 310-a.

Additionally or alternatively, the base station 105 may also signal the beginning of slot-based transmissions before mini-slot 305-c, where mini-slot 305-c may therefore be the last mini-slot based transmission (e.g., as illustrated with reference to resource schedule 301). As described herein, a signal used to indicate the beginning of slot-based transmissions may be a dedicated signal within mini-slot 305-b or at a beginning of mini-slot 305-c, or may be included in a PDCCH 315-b or 315-c. Additionally or alternatively, the base station 105 and the UE 115 may determine (e.g., implicitly) a number of mini-slots 305 that may follow the first mini-slot transmission based on a shared configuration (e.g., implemented via RRC signaling or communications standards). In some cases, mini-slot 305-c may include more resources than other mini-slots 305, based on the end of the mini-slot based transmissions.

In some cases, based on its capabilities, the base station 105 may implement resource schedule 302, where the base station 105 may reschedule data from mini-slot 305-a into mini-slot 305-b, mini-slot 305-c, mini-slot 305-d, or slot 310-a. Additionally or alternatively, the base station 105 may also signal the beginning of slot-based transmissions before slot 310-a, where mini-slot 305-d may be the last mini-slot based transmission. As described with reference to FIGS. 1 and 2, a signal to indicate the beginning of slot-based transmissions may be a dedicated signal (e.g., a reference signal) within mini-slots 305-b, 305-c, or 305-d, or may be a dedicated signal at a beginning of slot 310-a. In some cases, reception of a dedicated signal may indicate that the base station 105 is to transmit the subsequent slot 310-a using slot-based transmissions, where a remainder of the current slot 310 may still be partitioned into mini-slots 305. Additionally or alternatively, the signal to indicate the beginning of slot-based transmissions may be included in a PDCCH 315-b, 315-c, 315-d, or 315-e. In other cases, the base station 105 and the UE 115 may determine the number of mini-slots 305 that follow the first mini-slot transmission based on a shared configuration (e.g., implemented via RRC signaling or communications standards).

In some cases, the capabilities of the base station 105 may support the implementation of resource schedule 303, where the base station 105 may reschedule data from mini-slot 305-a into one of the mini-slots 305-b through 305-f, or into slot 310-b. Additionally or alternatively, the base station 105 may also prepare data to signal the beginning of slot-based transmissions before mini-slot 305-f, where mini-slot 305-f may be the last mini-slot based transmission. As described herein, a signal to indicate the beginning of slot-based transmissions may be a dedicated signal within one of mini-slots 305-b through 305-e, or may be a dedicated signal at a beginning of mini-slot 305-f. Additionally or alternatively, the signal to indicate the beginning of slot-based transmissions may be included in one of PDCCHs 315-*b* through 315-*f*. In other cases, the base station 105 and the UE 115 may implicitly determine how many mini-slots 305 may follow the first mini-slot transmission based on a shared configuration (e.g., implemented via RRC signaling or communications standards). In some cases, mini-slot 305-*f* may include more resources than other mini-slots 305, based on the end of mini-slot based transmissions.

In some cases, the base station 105 may have capabilities that support the implementation of resource schedule 304, where the base station 105 may reschedule data from mini-slot 305-*a* into one of mini-slots 305-*b* through 305-*g*, or slot 310-*b*. Additionally or alternatively, the base station 105 may also prepare data to signal the beginning of slot-based transmissions before slot 310-*b*, where mini-slot 305-*g* may be the last mini-slot based transmission. As discussed herein, a signal to indicate the beginning of slot-based transmissions may be a dedicated signal within one of mini-slots 305-*b* through 305-*g*, or a dedicated signal at the beginning of slot 310-*b*. In some cases, reception of a dedicated signal may indicate that the base station 105 is to transmit the subsequent slot 310-*b* using slot-based transmissions, where a remainder of a current slot 310 may still be partitioned into mini-slots 305. Additionally or alternatively, the signal to indicate the beginning of slot-based transmissions may be included in one of PDCCHs 315-*b* through 315-*h*. In other cases, the base station 105 and the UE 115 may implicitly determine how many mini-slots 305 may follow the first mini-slot transmission based on a shared configuration (e.g., implemented via RRC signaling or communications standards).

In some cases, the base station 105 may transmit multiple grants for multiple UEs corresponding to mini-slots 305 using PDCCH in a same control region. In some examples, a PDCCH 315 associated with a mini-slot 305 may correspond to a respective control monitoring pattern of a limit of blind decodes or CCEs for the UE 115 to process. In some examples, a PDCCH limit associated with a slot 310 may also correspond to a limit of blind decodes or CCEs for the UE 115 to process. In some cases, the UE 115 may follow a control monitoring pattern that splits the per slot limit of CCEs or blind decodes across mini-slots 305 (e.g., mini-slots 305 between boundaries 320 of the same slot). In some examples, the UE 115 may split the per slot limit equally among the mini-slots 305 within the slot 310. Additionally or alternatively, the UE 115 may split the per slot limit among the mini-slots 305 in proportion to a number of symbols allocated to each mini-slot 305, when compared to a number of symbols allocated to the entire slot 310. In some cases, if the limit is split according to the number of symbols, the process may also involve a rounding, a floor, or a ceiling operation to eliminate a decimal portion of a calculated mini-slot PDCCH limit. In the case where mini-slot scheduling may end before a last mini-slot of the slot (e.g., resulting in a larger mini-slot 305), the remaining limit may be allocated to the remaining portion of the slot (e.g., to the larger mini-slot 305). In some cases, the UE 115 may ensure that the sum of the limits for mini-slot PDCCHs 315 within slot boundaries 320 is less than or equal to the per slot limit for the same slot boundaries 320.

For example, the UE 115 may be configured with a limit of 44 blind decodes per slot 310 (e.g., for a sub-carrier spacing of 15 kHz) and may be configured with four mini-slots 305 per slot 310 (e.g., as in resource schedule 302 or 304). Additionally, the UE 115 may be configured with four symbols in the first two mini-slots 305 following a slot boundary 320 and with three symbols in the last two mini-slots 305 (e.g., leading up to a slot boundary 320). In the case where the per slot limit is split equally between mini-slot PDCCHs 315, the UE 115 may monitor each mini-slot PDCCH 315 for 11 blind decodes each. Additionally or alternatively, the amount of blind decodes for each mini-slot 305 may be found by multiplying the per slot limit (e.g., 44 blind decodes) by the fraction of the symbols that a mini-slot 305 uses out of the whole slot 310, then performing a rounding operation. For example, in the case of a mini-slot with four symbols (e.g., mini-slot 305-*b*), the per slot limit may be multiplied by 4/14, and then a rounding operation may be performed, which may result in a mini-slot limit of 13 blind decodes. Similarly, a mini-slot 305 with three symbols (e.g., mini-slot 305-*c*) may be assigned a limit of 9 blind decodes.

In some cases, similar operations may be performed to determine a mini-slot limit of a larger mini-slot 305 (e.g., mini-slots 305-*c* and 305-*f* in resource schedules 301 and 303). If the per slot limit is 44 blind decodes and the mini-slot limits are divided equally, larger mini-slots 305 may receive a remainder of the limits up to the next slot boundary 320. For example, mini-slot 305-*c* may receive 22 blind decodes (e.g., because mini-slot 305-*c* takes the space of two mini-slots 305) and mini-slot 305-*f* may receive 33 blind decodes (e.g., because mini-slot 305-*f* takes the space of three mini-slots 305). Additionally or alternatively, the per slot limit may be allocated to larger mini-slots 305 based on the fraction of symbols within the larger mini-slot 305 compared to the symbols for the entire slot 310. In such cases, the process for calculating the limit for each mini-slot 305 may follow the same steps as detailed above, and the larger mini-slot 305 may be allocated a total number limits assigned to any mini-slots 305 the larger mini-slot 305 replaces.

Figure 4:
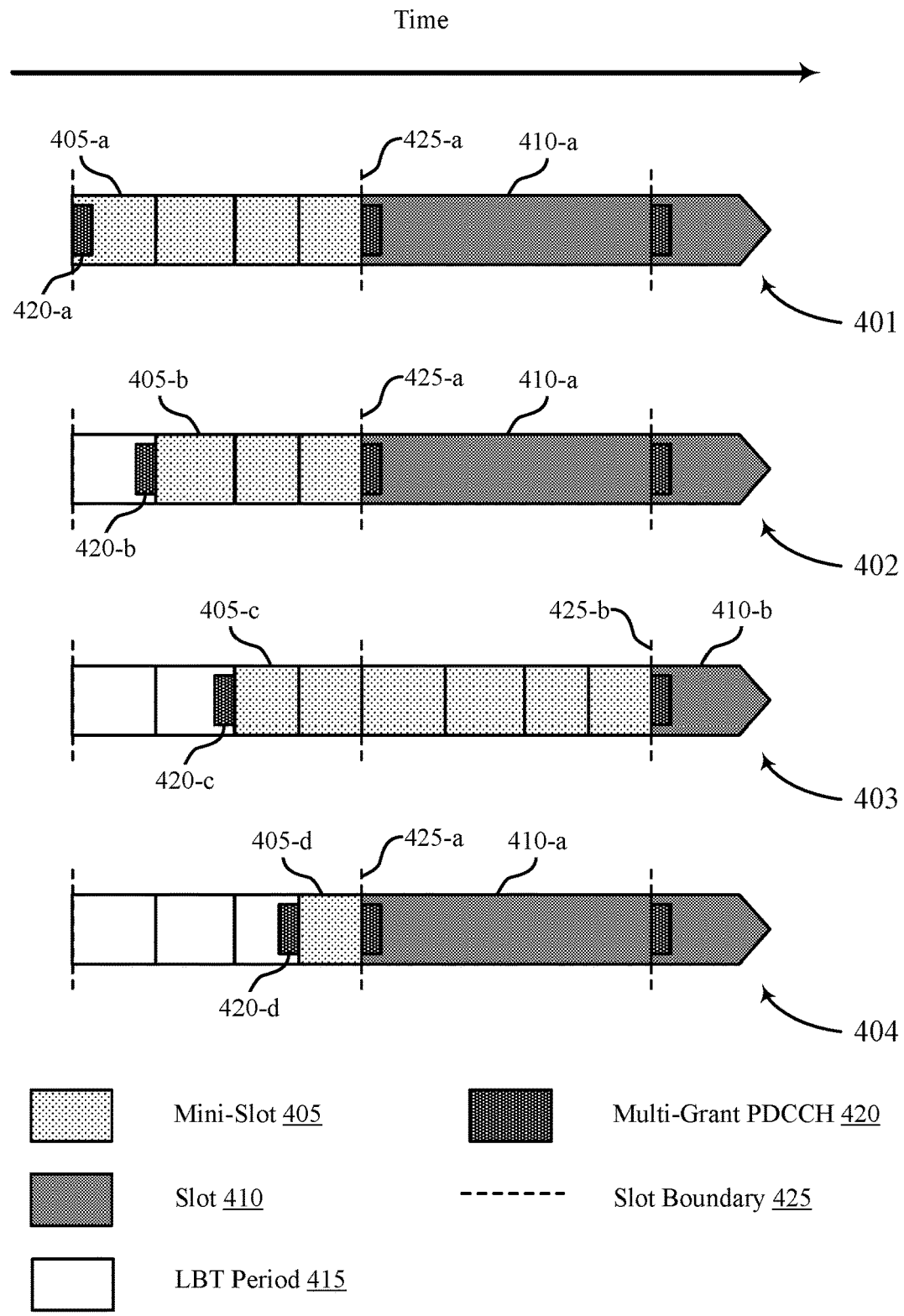

FIG. 4 illustrates examples of resource schedules 401, 402, 403, and 404 that support control channel design for shared wireless communications in accordance with aspects of the present disclosure. In some examples, resource schedules 401, 402, 403, and 404 may implement aspects of wireless communications systems 100 or 200. A resource schedule 400 (e.g., resource schedule 401, 402, 403, or 404) may include communications transmitted by a base station 105, which may be an example of a base station 105 described with reference to FIGS. 1-3. Additionally, a UE 115 may receive the communications transmitted by the base station 105, which UE may be an example of a UE 115 described with reference to FIGS. 1-3.

As mentioned above with reference to FIGS. 1-3, the base station 105 may perform a contention-based access procedure (e.g., LBT) to gain access to shared network resources (e.g., unlicensed spectrum), following which the base station 105 may begin transmissions to the UE 115 using shortened-TTI (e.g., mini-slot) resources. In some cases, the base station 105 may prepare a resource schedule 400 before passing the LBT procedure. For example, the base station 105 may prepare mini-slots 405 for communications that are to take place with the UE 115 following an LBT pass (e.g., at the end of LBT period 415). However, in some cases, neither the base station 105 nor the UE 115 may be aware of when the LBT pass may occur. Therefore, the base station 105 may modify resource schedule 400, where the modification may be based on capabilities of the base station 105.

Additionally, the base station 105 may determine to transmit a multi-grant PDCCH 420 as part of the resource schedule, where the multi-grant PDCCH 420 may include grant information for one or more mini-slots 405 that are also part of the resource schedule. Therefore, the base station 105 may also prepare a continuous downlink data channel across one or more mini-slots 405, without a gap for a control region, and the UE 115 may not decode another PDCCH after a first mini-slot 405. In some cases, the base station 105 may transmit multiple grants (e.g., for multiple UEs 115) corresponding to mini-slots 405 using PDCCH in a same control region. In some examples, a multi-grant PDCCH 420 may be located within symbols of a PDSCH of a first mini-slot 405 after LBT period 415 (e.g., if the first mini-slot 405 after the LBT pass is a first mini-slot 405-*a* of the slot 410, as in resource schedule 401). In some cases, a multi-grant PDCCH 420 may be located before a first mini-slot 405, at an end of a previously-prepared downlink data set (e.g., as in resource schedules 402, 403, and 404). A multi-grant PDCCH 420 may be transmitted once after the LBT pass and may carry multiple grants for following mini-slots 405.

In some examples, the resource grant in the multi-grant PDCCH 420 may correspond to the mini-slots 405 in a remaining part of the slot (e.g., up to slot boundary 425) after the LBT pass (e.g., as shown in resource schedules 401, 402, and 404). Additionally or alternatively, the resource grant in the multi-grant PDCCH may correspond to a number of mini-slots 405 which may extend into a next slot (e.g., past slot boundary 425, as shown in resource schedule 403). In some cases, the limit for CCEs or blind decodes for the multi-grant PDCCH 420 may be determined by the number of mini-slots 405 corresponding to the multi-grant PDCCH 420. In some examples, this process may involve totaling the limits for each mini-slot 405, which may be calculated as described herein with reference to FIG. 3 (e.g., allocating each limit to each mini-slot 405 equally or basing limits on a proportional number of symbols included in each mini-slot 405).

In one example, the base station 105 may determine that the LBT pass occurs before mini-slot 405-*a*. As such, the base station 105 may determine to use resource schedule 401 and may transmit multi-grant PDCCH 420-*a* at or prior to the beginning of mini-slot 405-*a*. In some cases, the base station 105 may determine (e.g., based on the capabilities of the base station 105) to transmit mini-slots 405 up until slot boundary 425-*a* and may include grants for each of these mini-slots 405 within multi-grant PDCCH 420-*a*. In an example where each slot is limited to 44 blind decodes and where slot limits are split equally among mini-slots 405, multi-grant PDCCH 420-*a* may accordingly be limited to 44 blind decodes (e.g., the total of all mini-slot limits). Additionally, the base station 105 may indicate to the UE 115 that slot-based communications are to begin with slot 410-*a* (e.g., via signaling or a common configuration).

In a second example, the base station 105 may determine that the LBT pass occurs before mini-slot 405-*b* but not before mini-slot 405-*a*. As such, the base station 105 may determine to use resource schedule 402 and may transmit multi-grant PDCCH 420-*b* prior to a beginning of mini-slot 405-*b*. In some cases, the base station 105 may determine (e.g., based on the capabilities of the base station 105) to transmit mini-slots 405 up until slot boundary 425-*a* and may include grants for each of these mini-slots 405 within multi-grant PDCCH 420-*b*. In an example where each slot is limited to 44 blind decodes and where slot limits are split equally among mini-slots 405, multi-grant PDCCH 420-*b* may accordingly be limited to 33 blind decodes (e.g., the total of all mini-slot limits). Additionally, the base station 105 may indicate to the UE 115 that slot-based communications are to begin with slot 410-*a* (e.g., via signaling or a common configuration).

In a third example, the base station 105 may determine that the LBT pass occurs before mini-slot 405-*c* but not before mini-slot 405-*b*. As such, the base station 105 may determine to use resource schedule 403 and may transmit multi-grant PDCCH 420-*c* prior to a beginning of mini-slot 405-*c*. In some cases, the base station 105 may determine (e.g., based on the capabilities of the base station 105) to transmit mini-slots 405 up until slot boundary 425-*b* and may include grants for each of these mini-slots 405 within multi-grant PDCCH 420-*c*. In an example where each slot is limited to 44 blind decodes and where slot limits are split equally among mini-slots 405, multi-grant PDCCH 420-*c* may accordingly be limited to 66 blind decodes (e.g., the total of all mini-slot limits). Additionally, the base station 105 may indicate to the UE 115 that slot-based communications are to begin with slot 410-*b* (e.g., via signaling or a common configuration).

In a fourth example, the base station 105 may determine that the LBT pass occurs before mini-slot 405-*d* but not before mini-slot 405-*c*. As such, the base station 105 may determine to use resource schedule 404 and may transmit multi-grant PDCCH 420-*d* prior to the beginning of mini-slot 405-*d*. In some cases, the base station 105 may determine (e.g., based on the capabilities of the base station 105) to transmit mini-slots 405 up until slot boundary 425-*a* and may include grants for each of these mini-slots 405 within multi-grant PDCCH 420-*d*. In an example where each slot is limited to 44 blind decodes and where slot limits are split equally among mini-slots 405, multi-grant PDCCH 420-*d* may accordingly be limited to 11 blind decodes (e.g., the total of all mini-slot limits). Additionally, the base station 105 may indicate to the UE 115 that slot-based communications are to begin with slot 410-*a* (e.g., via signaling or a common configuration).

Figure 5:
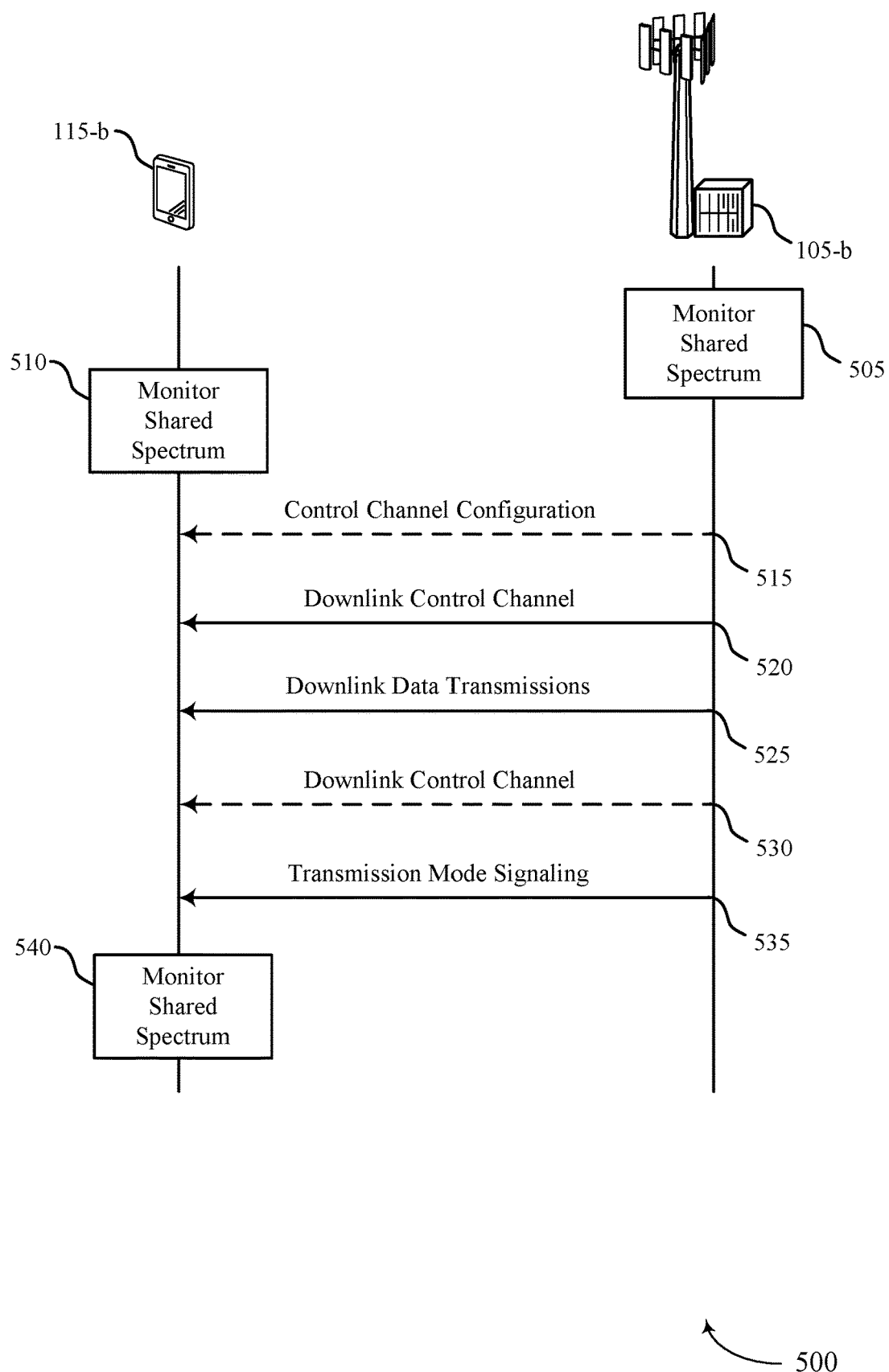
FIG. 5 illustrates an example of a process flow that supports control channel design for shared wireless communications in accordance with aspects of the present disclosure.

FIG. 5 illustrates an example of a process flow that supports control channel design for shared wireless communications in accordance with aspects of the present disclosure. In some examples, process flow 500 may implement aspects of wireless communications systems 100 or 200. Additionally, process flow 500 may implement aspects of resource schedules 300 or 400. Further, process flow 500 may be implemented by a UE 115-*b* and a base station 105-*b*, which may be examples of a UE 115 and a base station 105 described with reference to FIGS. 1-4.

In the following description of the process flow 500, the operations between UE 115-*b* and base station 105-*b* may be transmitted in a different order than the order shown, or the operations performed by base station 105-*b* and UE 115-*b* may be performed in different orders or at different times. Some operations may also be left out of the process flow 500, or other operations may be added to the process flow 500. It is to be understood that while base station 105-*b* and UE 115-*b* are shown performing a number of the operations of process flow 500, any wireless device may perform the operations shown.

At 505, base station 105-*b* may monitor a channel of a shared radio frequency spectrum band during an LBT procedure, the channel being associated with communications between base station 105-*b* and UE 115-*b*.

Similarly, at 510, UE 115-*b* may monitor the shared radio frequency spectrum band for a downlink control channel from base station 105-*b* during a first TTI according to a first transmission mode (e.g., mini-slot transmissions).

At 515, base station 105-*b* may identify a number (e.g., a maximum or limit) of blind decodes for the downlink control channel and a number (e.g., a maximum or limit) of CCEs for the downlink control channel, where the total number of blind decodes and the number of CCEs may be distributed among TTIs of the first transmission mode. In some cases, base station 105-*b* or UE 115-*b* may identify a number of blind decodes for the downlink control channel and a number of CCEs for the downlink control channel.

At 520, base station 105-*b* may transmit a downlink control channel to UE 115-*b* according to the first transmission mode during the first TTI, based on the monitoring of the shared spectrum performed by base station 105-*b*. Additionally, UE 115-*b* may receive the downlink control channel from base station 105-*b* during the first TTI based on the monitoring performed by UE 115-*b*. In some cases, base station 105-*b* may transmit, and UE 115-*b* may receive, the downlink control channel according to the first transmission mode during the first TTI based on a first subset of the total number of blind decodes and a first subset of the number of CCEs. Additionally or alternatively, base station 105-*b* may transmit, and UE 115-*b* may receive, the downlink control channel based on the identified number of blind decodes and the identified number of CCEs.

In some examples, the downlink control channel may indicate respective grants for each of a set of TTIs including a second TTI subsequent to the first TTI. In some cases, the number of blind decodes and the number of CCEs may be based on a number of TTIs of the set of TTIs. In some examples, base station 105-*b* or UE 115-*b* may determine the set of TTIs based on the monitoring of the shared spectrum. In some cases, the set of TTIs may include TTIs excluding the first TTI. Additionally, base station 105-*b* may transmit the downlink control channel to UE 115-*b* in a shared data portion of the first TTI and may also transmit the downlink control channel to UE 115-*b* before a shared data portion of the second TTI subsequent the first TTI. In some cases, base station 105-*b* may transmit the downlink control channel to UE 115-*b* via a first subset of the CCEs during the first TTI and may transmit the downlink control channel via a second subset of the CCEs during the second TTI.

At 525, base station 105-*b* may transmit one or more downlink data transmissions to UE 115-*b* over the set of TTIs in accordance with the respective grants.

At 530, base station 105-*b* may transmit the downlink control channel to UE 115-*b* according to the first transmission mode during a second transmission time interval based on a second subset of the total number of blind decodes and a second subset of the number of CCEs. In some cases, the first subset of the total number of blind decodes and the second subset of the total number of blind decodes may be the same and the first subset of the number of CCEs and the second subset of the number of CCEs may be the same.

At 535, base station 105-*b* may transmit a signaling to UE 115-*b* indicating a change from the first transmission mode to a second transmission mode (e.g., slot-based transmissions), the first transmission mode associated with a first TTI duration (e.g., mini-slots or sTTIs) and the second transmission mode associated with a second TTI duration that is longer than the first TTI duration (e.g., slots). In some cases, transmitting the signaling may include transmitting a reference signal that indicates a beginning of communications according to the second transmission mode. In some examples of signaling using a reference signal, base station 105-*b* may transmit the reference signal during a first portion of the first TTI and transmit a single downlink control channel during a remaining portion of the first TTI based on transmitting the reference signal during the first portion of the first TTI. Additionally, UE 115-*b* may receive the reference signal during the first portion of the first TTI and monitor the shared radio frequency spectrum band during a remaining portion of the first TTI based on receiving the reference signal during the first portion of the first TTI.

In other cases, transmitting the signaling may include transmitting a PDCCH to UE 115-*b*, the PDCCH including a switching indicator that indicates one or more of a beginning of communications according to the second transmission mode or a continuation of communications according to the first transmission mode. Additionally or alternatively, transmitting the signaling may include transmitting an RRC message to UE 115-*b*, the RRC message indicating a fixed number of TTIs for communications according to the first transmission mode before the change from the first transmission mode to the second transmission mode.

At 540, UE 115-*b* may monitor the shared radio frequency spectrum band for the downlink control channel from base station 105-*b* during a second TTI based on the signaling. In some cases, the second TTI subsequent to the first TTI may include the beginning of communications according to the second transmission mode.

Figure 6:
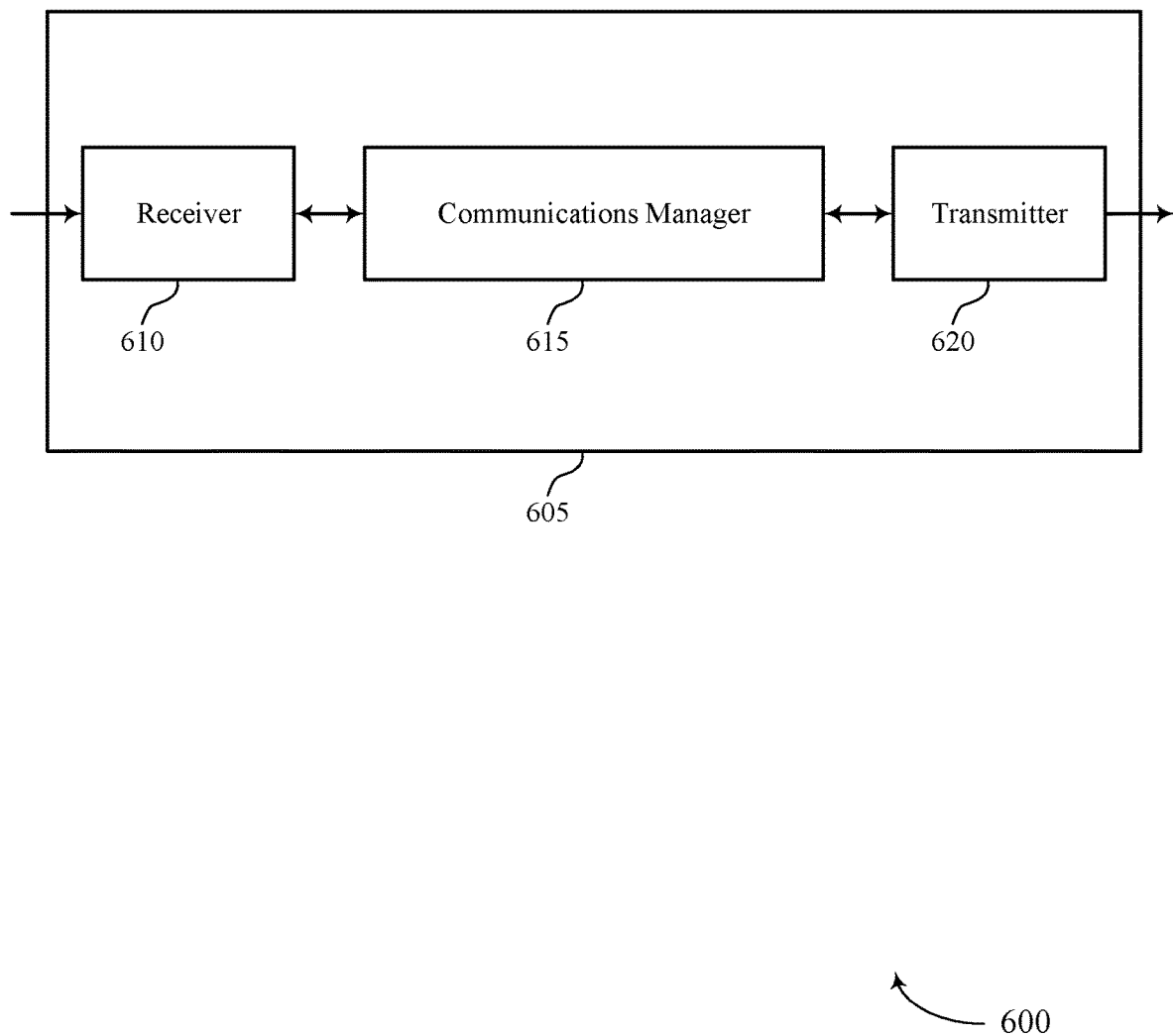
FIGS. 6 and 7 show block diagrams of devices that support control channel design for shared wireless communications in accordance with aspects of the present disclosure.

FIG. 6 shows a block diagram 600 of a device 605 that supports control channel design for shared wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to control channel design for shared wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may monitor a shared radio frequency spectrum band for a downlink control channel from a base station during a first TTI according to a first transmission mode, receive, from the base station, signaling indicating a change from the first transmission mode to a second transmission mode, the first transmission mode associated with a first TTI duration and the second transmission mode associated with a second TTI duration that is longer than the first TTI duration, and monitor the shared radio frequency spectrum band for the downlink control channel from the base station during a second TTI based on the signaling.

The communications manager 615 may also monitor a shared radio frequency spectrum band for a downlink control channel from a base station during a first TTI, receive the downlink control channel from the base station during the first TTI based on the monitoring, the downlink control channel indicating respective grants for each of a set of TTIs including a second TTI subsequent the first TTI, and receive one or more downlink data transmissions over the set of TTIs in accordance with the respective grants. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal process (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the communications manager 615 as described herein may be implemented to realize one or more potential advantages. For example, communications manager 615 may increase communication reliability and decrease communication latency at a UE 115. Communications manager 615 may enable the UE 115 to receive transmissions of different-sized TTIs (e.g., slots and mini-slots), and may enable the UE 115 to switch transmission modes associated with the different-sized TTIs, which may reduce transmission delays and retransmissions. Similarly, communications manager 615 may save power and increase battery life at a UE 115 by reducing transmission delays and retransmissions.

Figure 7:
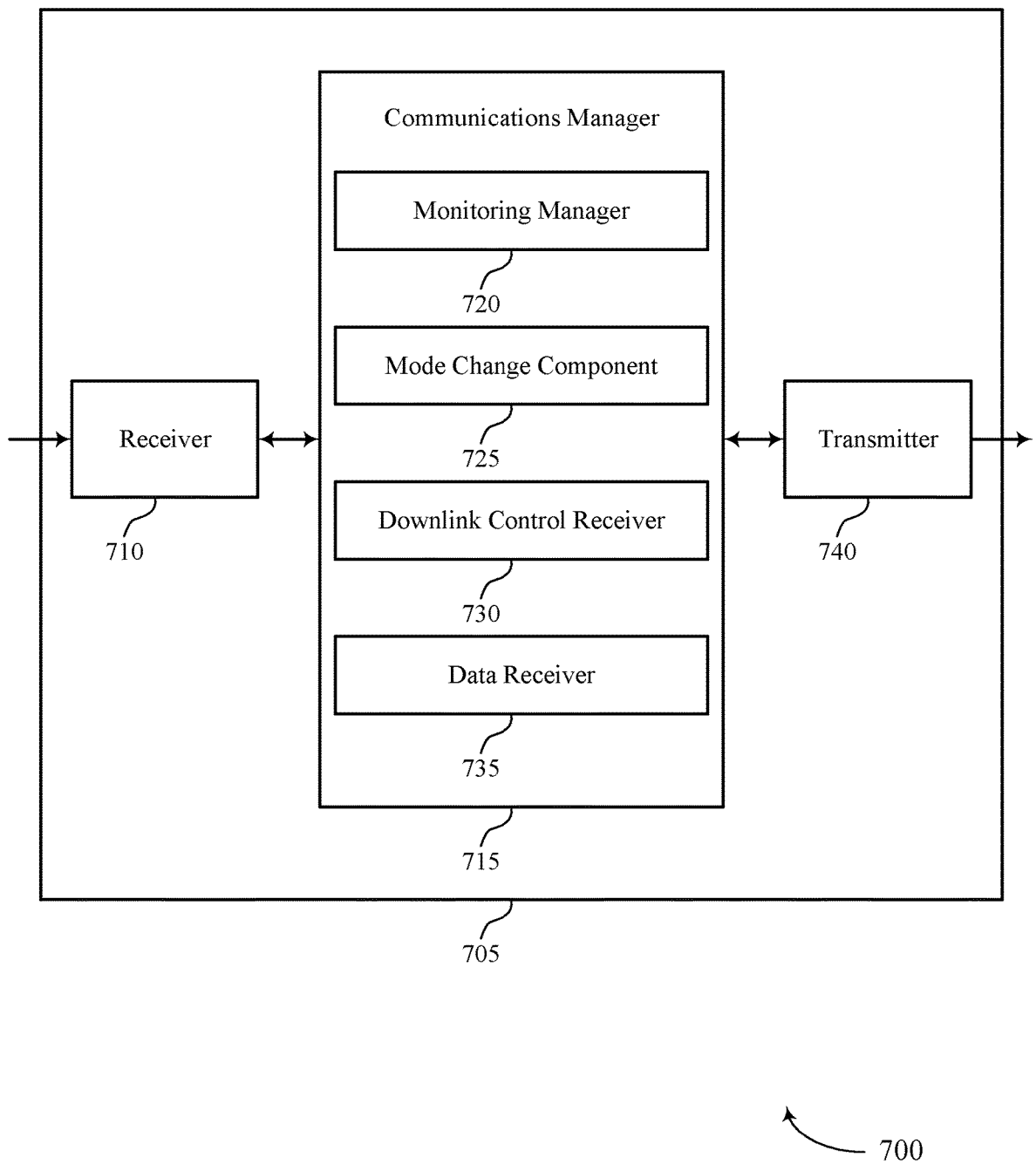

FIG. 7 shows a block diagram 700 of a device 705 that supports control channel design for shared wireless communications in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to control channel design for shared wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a monitoring manager 720, a mode change component 725, a downlink control receiver 730, and a data receiver 735. The communications manager 715 may be an example of aspects of the communications manager 910 described herein.

The monitoring manager 720 may monitor a shared radio frequency spectrum band for a downlink control channel from a base station during a first TTI according to a first transmission mode and monitor the shared radio frequency spectrum band for the downlink control channel from the base station during a second TTI based on received signaling.

The mode change component 725 may receive, from the base station, signaling indicating a change from the first transmission mode to a second transmission mode, the first transmission mode associated with a first TTI duration and the second transmission mode associated with a second TTI duration that is longer than the first TTI duration.

The monitoring manager 720 may monitor a shared radio frequency spectrum band for a downlink control channel from a base station during a first TTI.

The downlink control receiver 730 may receive the downlink control channel from the base station during the first TTI based on the monitoring, the downlink control channel indicating respective grants for each of a set of TTIs including a second TTI subsequent the first TTI.

The data receiver 735 may receive one or more downlink data transmissions over the set of TTIs in accordance with the respective grants.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

A processor of a UE 115 (for example, controlling the receiver 710, the transmitter 740, or the transceiver 920 as described with reference to FIG. 9) may increase communication reliability and accuracy by enabling the UE 115 to receive transmissions of different-sized TTIs (e.g., slots and mini-slots) and to switch transmission modes associated with the different-sized TTIs, which may reduce transmission delays and retransmissions (e.g., via implementation of system components described with reference to FIG. 8). Further, the processor of the UE 115 may identify one or more aspects of a downlink signaling (e.g., with respect to one or more resource schedules) to perform the processes described herein. The processor of the UE 115 may identify resources or transmissions corresponding to different transmission modes to save power and increase battery life at the UE 115 (e.g., by strategically utilizing available resources and receiving intended transmissions).

Figure 8:
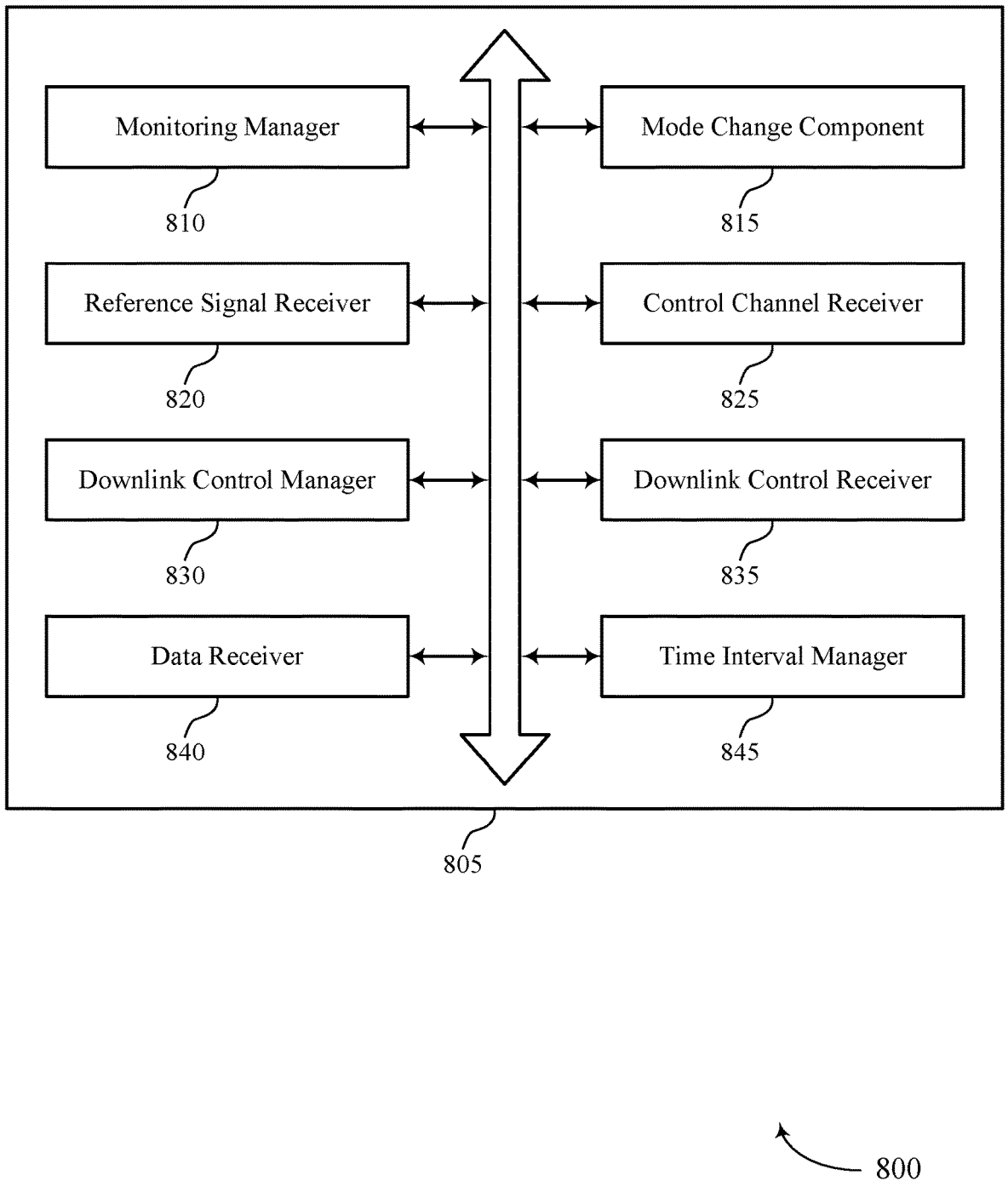
FIG. 8 shows a block diagram of a communications manager that supports control channel design for shared wireless communications in accordance with aspects of the present disclosure.

FIG. 8 shows a block diagram 800 of a communications manager 805 that supports control channel design for shared wireless communications in accordance with aspects of the present disclosure. The communications manager 805 may be an example of aspects of a communications manager 615, a communications manager 715, or a communications manager 910 described herein. The communications manager 805 may include a monitoring manager 810, a mode change component 815, a reference signal receiver 820, a control channel receiver 825, a downlink control manager 830, a downlink control receiver 835, a data receiver 840, and a time interval manager 845. Each of these modules may communicate, directly or indirectly, with one another (e.g., via one or more buses).

The monitoring manager 810 may monitor a shared radio frequency spectrum band for a downlink control channel from a base station during a first TTI according to a first transmission mode. In some examples, the monitoring manager 810 may monitor the shared radio frequency spectrum band for the downlink control channel from the base station during a second TTI based on received signaling. In some cases, the monitoring manager 810 may monitor a shared radio frequency spectrum band for a downlink control channel from a base station during a first TTI. In some aspects, the monitoring manager 810 may monitor the shared radio frequency spectrum band during a remaining portion of the first TTI based on receiving the reference signal during the first portion of the first TTI. In some instances, the second TTI includes the beginning of communications according to a second transmission mode.

The mode change component 815 may receive, from the base station, signaling indicating a change from the first transmission mode to the second transmission mode, the first transmission mode associated with a first TTI duration and the second transmission mode associated with a second TTI duration that is longer than the first TTI duration.

The reference signal receiver 820 may receive a reference signal that indicates a beginning of communications according to the second transmission mode.

The control channel receiver 825 may receive a PDCCH from the base station, the PDCCH including a switching indicator that indicates one or more of a beginning of communications according to the second transmission mode or a continuation of communications according to the first transmission mode. In some examples, the control channel receiver 825 may receive an RRC message from the base station, the RRC message indicating a fixed number of TTIs for communications according to the first transmission mode before the change from the first transmission mode to the second transmission mode.

In some cases, the control channel receiver 825 may receive the downlink control channel according to the first transmission mode during the first TTI based on a first subset of the maximum number of blind decodes and a first subset of the maximum number of CCEs. In some instances, the control channel receiver 825 may receive the downlink control channel according to the first transmission mode during the second TTI based on a second subset of the maximum number of blind decodes and a second subset of the maximum number of CCEs. In some cases, the first subset of the maximum number of blind decodes and the second subset of the maximum number of blind decodes are the same. In some aspects, the first subset of the maximum number of CCEs and the second subset of the maximum number of CCEs are the same.

The downlink control manager 830 may identify a maximum number of blind decodes for the downlink control channel and a maximum number of CCEs for the downlink control channel, where the maximum total number of blind decodes and the maximum number of CCEs are distributed among TTIs of the first transmission mode.

The downlink control receiver 835 may receive the downlink control channel from the base station during the first TTI based on the monitoring, the downlink control channel indicating respective grants for each of a set of TTIs including a second TTI subsequent the first TTI. In some examples, the downlink control receiver 835 may receive the downlink control channel in a shared data portion of the first TTI. In some cases, the downlink control receiver 835 may receive the downlink control channel before a shared data portion of the second TTI subsequent the first TTI. The downlink control receiver 835 may receive a PDCCH from the base station before reaching an end of the fixed number of TTIs.

In some examples, the downlink control manager 830 may identify a maximum number of blind decodes for the downlink control channel and a maximum number of CCEs for the downlink control channel, where the downlink control channel is received based on the maximum number of blind decodes and the maximum number of CCEs. In some cases, the maximum number of blind decodes and the maximum number of CCEs are based on a number of TTIs of the set of TTIs.

The data receiver 840 may receive one or more downlink data transmissions over the set of TTIs in accordance with the respective grants.

The time interval manager 845 may determine the set of TTIs based on the monitoring, where the set of TTIs includes TTIs excluding the first TTI. The time interval manager 845 may also restart a timer comprising the fixed number of TTIs for communications according to the first transmission mode based at least in part on receiving the PDCCH before reaching the end of the fixed number of TTIs.

Figure 9:
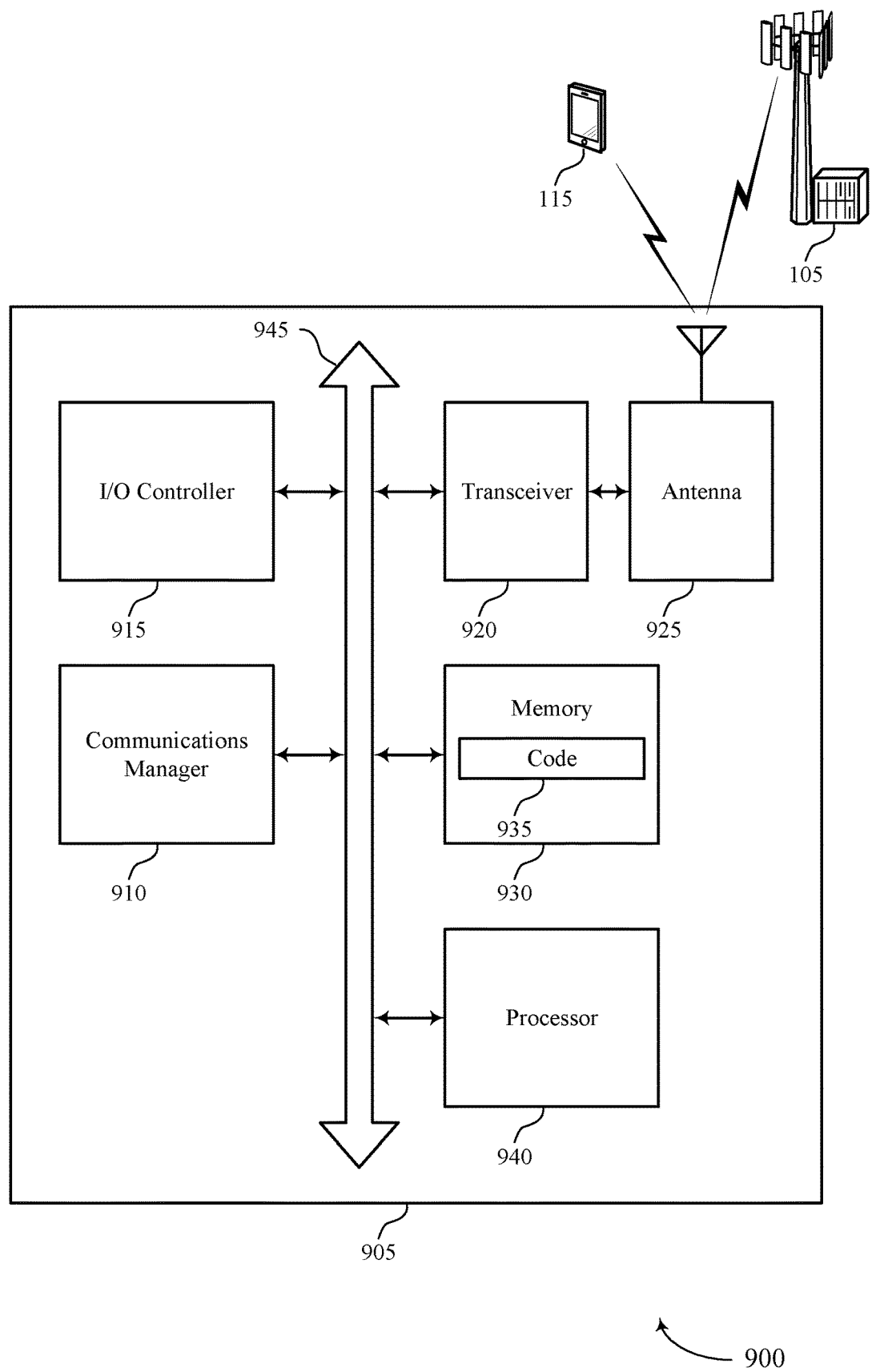
FIG. 9 shows a diagram of a system including a device that supports control channel design for shared wireless communications in accordance with aspects of the present disclosure.

FIG. 9 shows a diagram of a system 900 including a device 905 that supports control channel design for shared wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may monitor a shared radio frequency spectrum band for a downlink control channel from a base station during a first TTI according to a first transmission mode, receive, from the base station, signaling indicating a change from the first transmission mode to a second transmission mode, the first transmission mode associated with a first TTI duration and the second transmission mode associated with a second TTI duration that is longer than the first TTI duration, and monitor the shared radio frequency spectrum band for the downlink control channel from the base station during a second TTI based on the signaling.

The communications manager 910 may also monitor a shared radio frequency spectrum band for a downlink control channel from a base station during a first TTI, receive the downlink control channel from the base station during the first TTI based on the monitoring, the downlink control channel indicating respective grants for each of a set of TTIs including a second TTI subsequent the first TTI, and receive one or more downlink data transmissions over the set of TTIs in accordance with the respective grants.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925, or may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting control channel design for shared wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
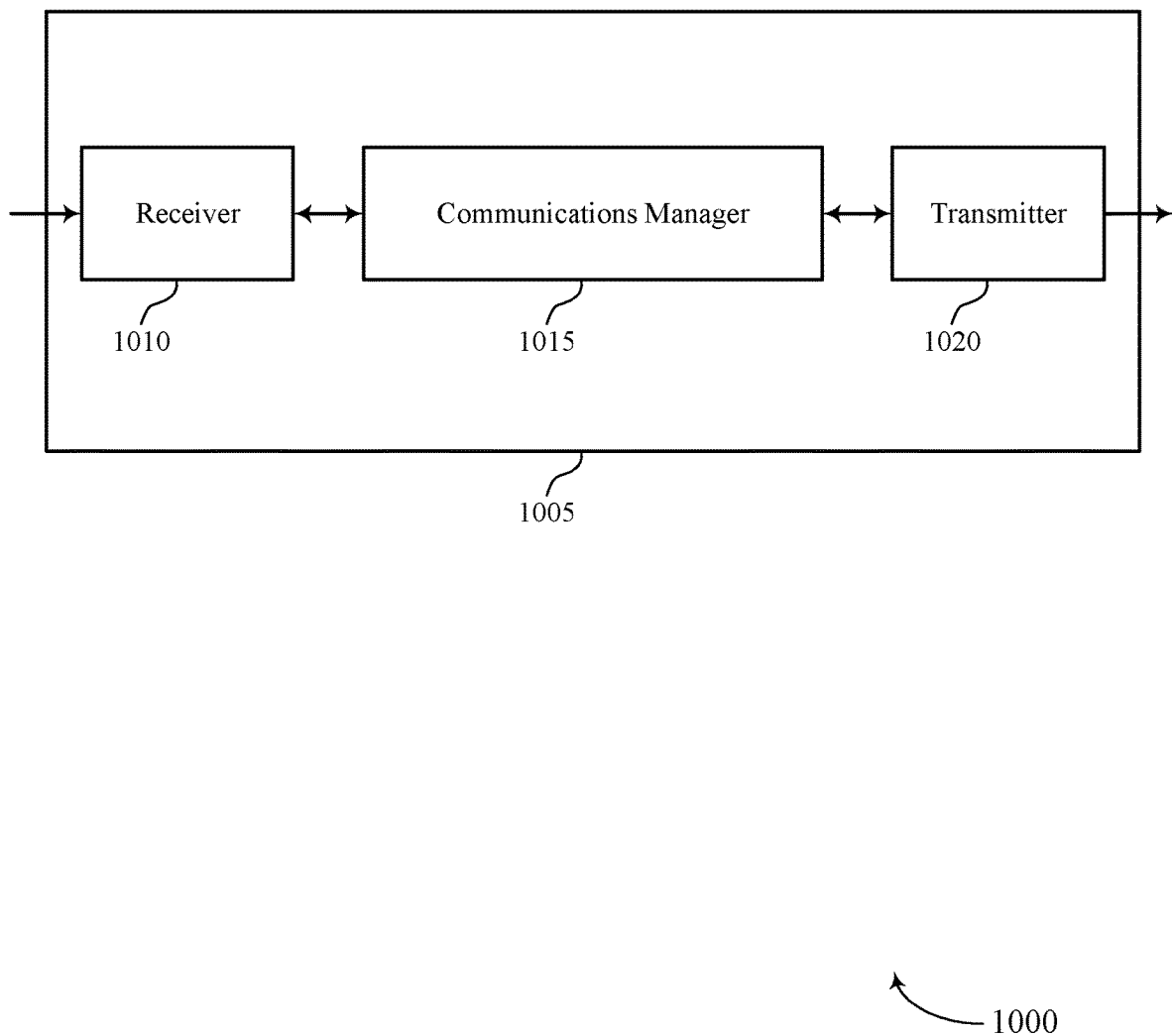
FIGS. 10 and 11 show block diagrams of devices that support control channel design for shared wireless communications in accordance with aspects of the present disclosure.

FIG. 10 shows a block diagram 1000 of a device 1005 that supports control channel design for shared wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to control channel design for shared wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may monitor a channel of a shared radio frequency spectrum band during an LBT procedure, the channel associated with communications between the base station and a UE, transmit a downlink control channel to the UE according to a first transmission mode during a first TTI based on the monitoring, and transmit, to the UE, signaling indicating a change from the first transmission mode to a second transmission mode, the first transmission mode associated with a first TTI duration and the second transmission mode associated with a second TTI duration that is longer than the first TTI duration.

The communications manager 1015 may also monitor a channel of a shared radio frequency spectrum band during an LBT procedure, the channel associated with communications between a base station and a UE, transmit a downlink control channel to the UE during a first TTI based on the monitoring, the downlink control channel indicating respective grants for each of a set of TTIs including a second TTI subsequent the first TTI, and transmit one or more downlink data transmissions to the UE over the set of TTIs in accordance with the respective grants. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
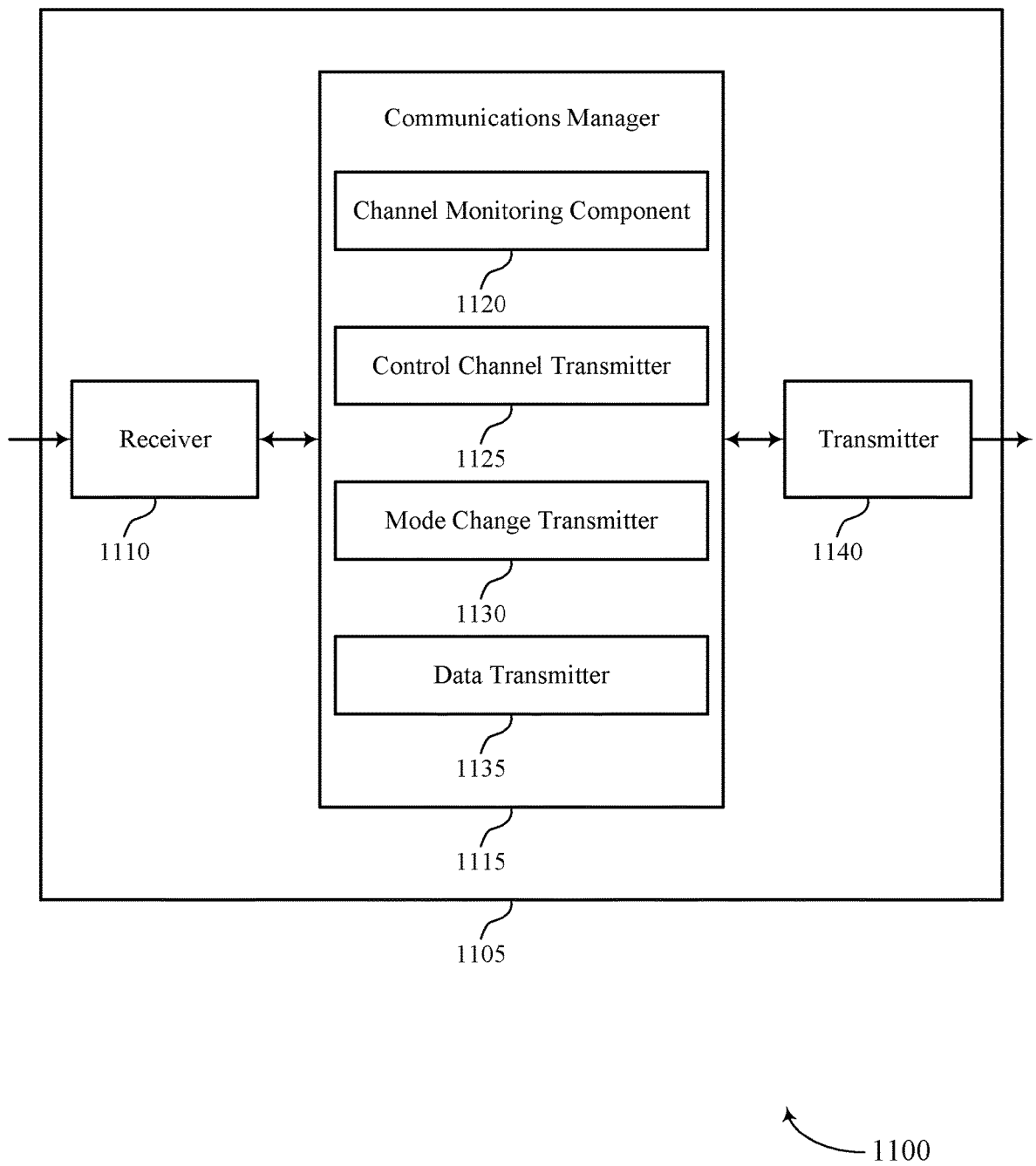

FIG. 11 shows a block diagram 1100 of a device 1105 that supports control channel design for shared wireless communications in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to control channel design for shared wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a channel monitoring component 1120, a control channel transmitter 1125, a mode change transmitter 1130, and a data transmitter 1135. The communications manager 1115 may be an example of aspects of the communications manager 1310 described herein.

The channel monitoring component 1120 may monitor a channel of a shared radio frequency spectrum band during an LBT procedure, the channel associated with communications between the base station and a UE.

The control channel transmitter 1125 may transmit a downlink control channel to the UE according to a first transmission mode during a first TTI based on the monitoring.

The mode change transmitter 1130 may transmit, to the UE, signaling indicating a change from the first transmission mode to a second transmission mode, the first transmission mode associated with a first TTI duration and the second transmission mode associated with a second TTI duration that is longer than the first TTI duration.

The channel monitoring component 1120 may monitor a channel of a shared radio frequency spectrum band during an LBT procedure, the channel associated with communications between a base station and a UE.

The control channel transmitter 1125 may transmit a downlink control channel to the UE during a first TTI based on the monitoring, the downlink control channel indicating respective grants for each of a set of TTIs including a second TTI subsequent the first TTI.

The data transmitter 1135 may transmit one or more downlink data transmissions to the UE over the set of TTIs in accordance with the respective grants.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
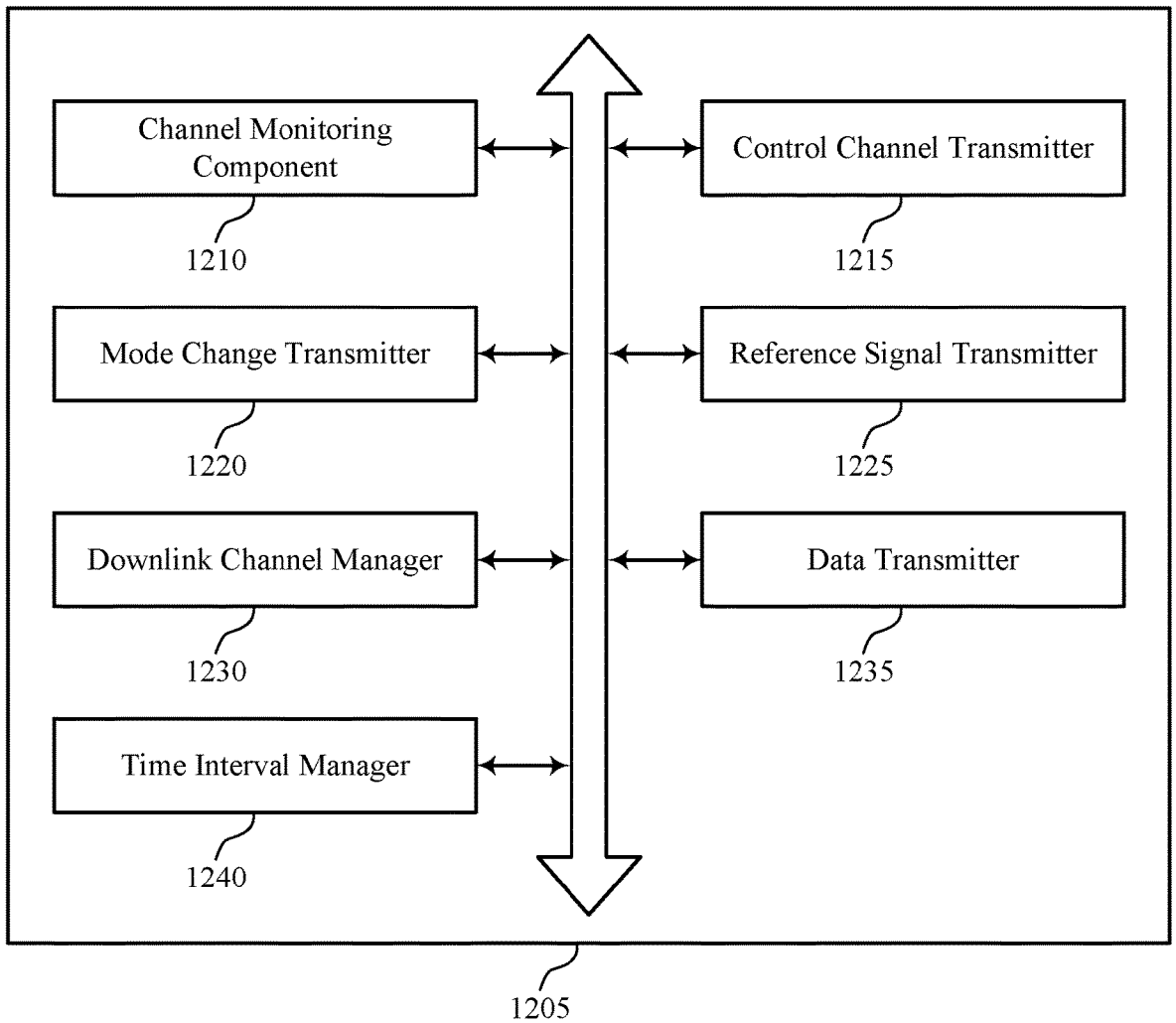
FIG. 12 shows a block diagram of a communications manager that supports control channel design for shared wireless communications in accordance with aspects of the present disclosure.

FIG. 12 shows a block diagram 1200 of a communications manager 1205 that supports control channel design for shared wireless communications in accordance with aspects of the present disclosure. The communications manager 1205 may be an example of aspects of a communications manager 1015, a communications manager 1115, or a communications manager 1310 described herein. The communications manager 1205 may include a channel monitoring component 1210, a control channel transmitter 1215, a mode change transmitter 1220, a reference signal transmitter 1225, a downlink channel manager 1230, a data transmitter 1235, and a time interval manager 1240. Each of these modules may communicate, directly or indirectly, with one another (e.g., via one or more buses).

The channel monitoring component 1210 may monitor a channel of a shared radio frequency spectrum band during an LBT procedure, the channel associated with communications between the base station and a UE.

The control channel transmitter 1215 may transmit a downlink control channel to the UE according to a first transmission mode during a first TTI based on the monitoring. In some examples, the control channel transmitter 1215 may transmit a downlink control channel to the UE during a first TTI based on the monitoring, the downlink control channel indicating respective grants for each of a set of TTIs including a second TTI subsequent the first TTI. In some cases, the control channel transmitter 1215 may transmit a single downlink control channel during a remaining portion of the first TTI based on transmitting the reference signal during the first portion of the first TTI. In some aspects, the control channel transmitter 1215 may transmit a PDCCH to the UE, the PDCCH including a switching indicator that indicates one or more of a beginning of communications according to the second transmission mode or a continuation of communications according to the first transmission mode. In some instances, the control channel transmitter 1215 may transmit an RRC message to the UE, the RRC message indicating a fixed number of TTIs for communications according to the first transmission mode before the change from the first transmission mode to the second transmission mode.

In some examples, the control channel transmitter 1215 may transmit the downlink control channel according to the first transmission mode during the first TTI based on a first subset of the maximum number of blind decodes and a first subset of the maximum number of CCEs. In some cases, the control channel transmitter 1215 may transmit the downlink control channel according to the first transmission mode during a second TTI subsequent the first TTI based on a second subset of the maximum number of blind decodes and a second subset of the maximum number of CCEs. In some aspects, the control channel transmitter 1215 may transmit the downlink control channel in a shared data portion of the first TTI. In some instances, the control channel transmitter 1215 may transmit the downlink control channel before a shared data portion of the second TTI subsequent the first TTI.

In some examples, the control channel transmitter 1215 may transmit the downlink control channel via a first subset of the CCEs during the first TTI. In some case, the control channel transmitter 1215 may transmit the downlink control channel via a second subset of the CCEs during the second TTI. In some aspects, the first subset of the maximum number of blind decodes and the second subset of the maximum number of blind decodes are the same. In some instances, the first subset of the maximum number of CCEs and the second subset of the maximum number of CCEs are the same.

The mode change transmitter 1220 may transmit, to the UE, signaling indicating a change from the first transmission mode to a second transmission mode, the first transmission mode associated with a first TTI duration and the second transmission mode associated with a second TTI duration that is longer than the first TTI duration.

The data transmitter 1235 may transmit one or more downlink data transmissions to the UE over the set of TTIs in accordance with the respective grants.

The reference signal transmitter 1225 may transmit a reference signal that indicates a beginning of communications according to the second transmission mode. In some examples, the reference signal transmitter 1225 may transmit the reference signal during a first portion of the first TTI. In some cases, a second TTI subsequent the first TTI includes the beginning of communications according to the second transmission mode.

The downlink channel manager 1230 may identify a maximum number of blind decodes for the downlink control channel and a maximum number of CCEs for the downlink control channel, where the maximum number of blind decodes and the maximum number of CCEs are distributed among TTIs of the first transmission mode.

In some examples, the downlink channel manager 1230 may identify a maximum number of blind decodes for the downlink control channel and a set of CCEs for the downlink control channel, where the downlink control channel is transmitted based on the maximum number of blind decodes and the set of CCEs. In some cases, the maximum number of blind decodes and the set of CCEs are based on a number of TTIs of the set of TTIs.

The time interval manager 1240 may determine the set of TTIs based on the monitoring, where the set of TTIs includes TTIs excluding the first TTI.

Figure 13:
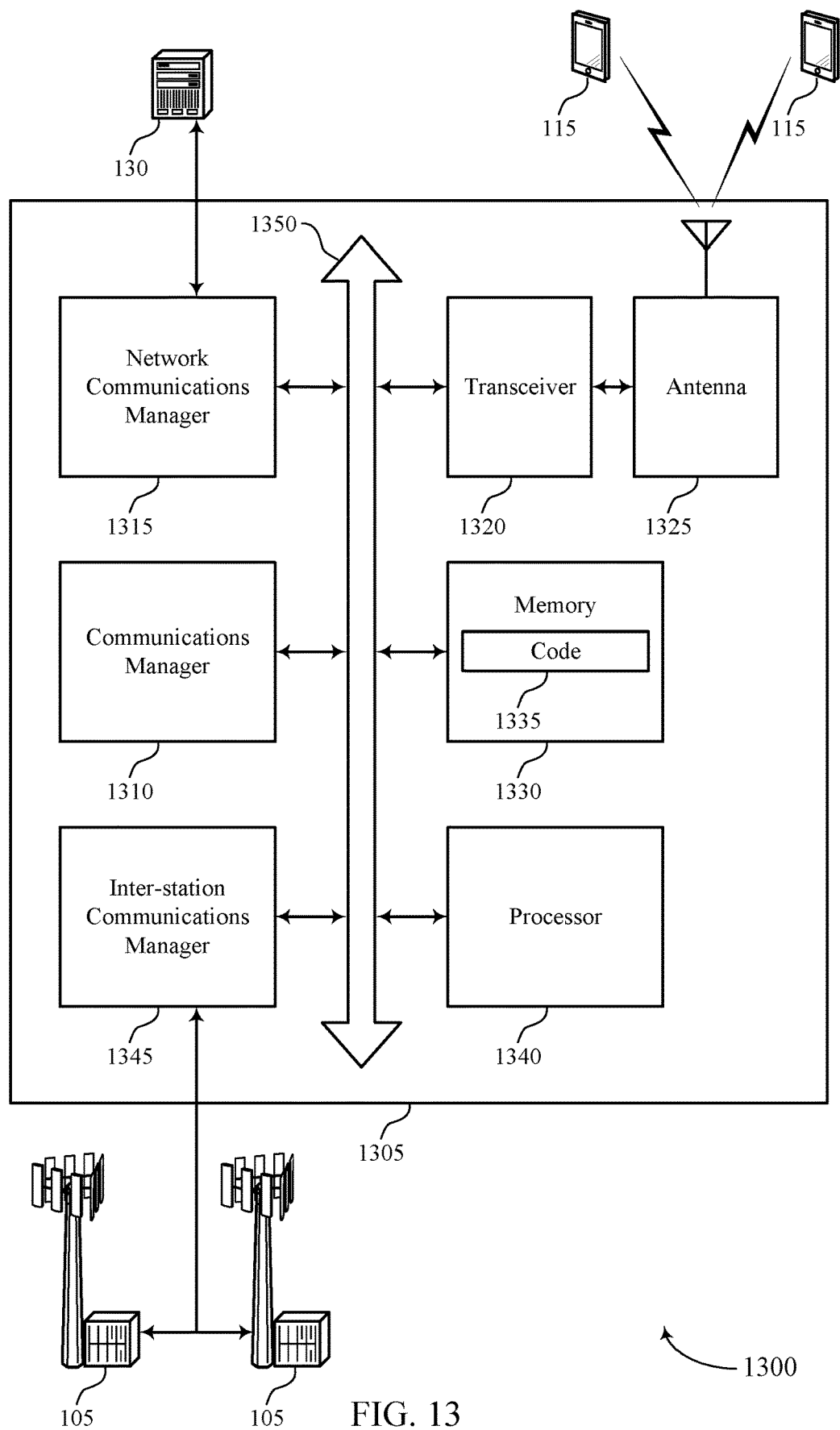
FIG. 13 shows a diagram of a system including a device that supports control channel design for shared wireless communications in accordance with aspects of the present disclosure.

FIG. 13 shows a diagram of a system 1300 including a device 1305 that supports control channel design for shared wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may monitor a channel of a shared radio frequency spectrum band during an LBT procedure, the channel associated with communications between the base station and a UE, transmit a downlink control channel to the UE according to a first transmission mode during a first TTI based on the monitoring, and transmit, to the UE, signaling indicating a change from the first transmission mode to a second transmission mode, the first transmission mode associated with a first TTI duration and the second transmission mode associated with a second TTI duration that is longer than the first TTI duration.

The communications manager 1310 may also monitor a channel of a shared radio frequency spectrum band during an LBT procedure, the channel associated with communications between a base station and a UE, transmit a downlink control channel to the UE during a first TTI based on the monitoring, the downlink control channel indicating respective grants for each of a set of TTIs including a second TTI subsequent the first TTI, and transmit one or more downlink data transmissions to the UE over the set of TTIs in accordance with the respective grants.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the device 1305 may include a single antenna 1325, or more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting control channel design for shared wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
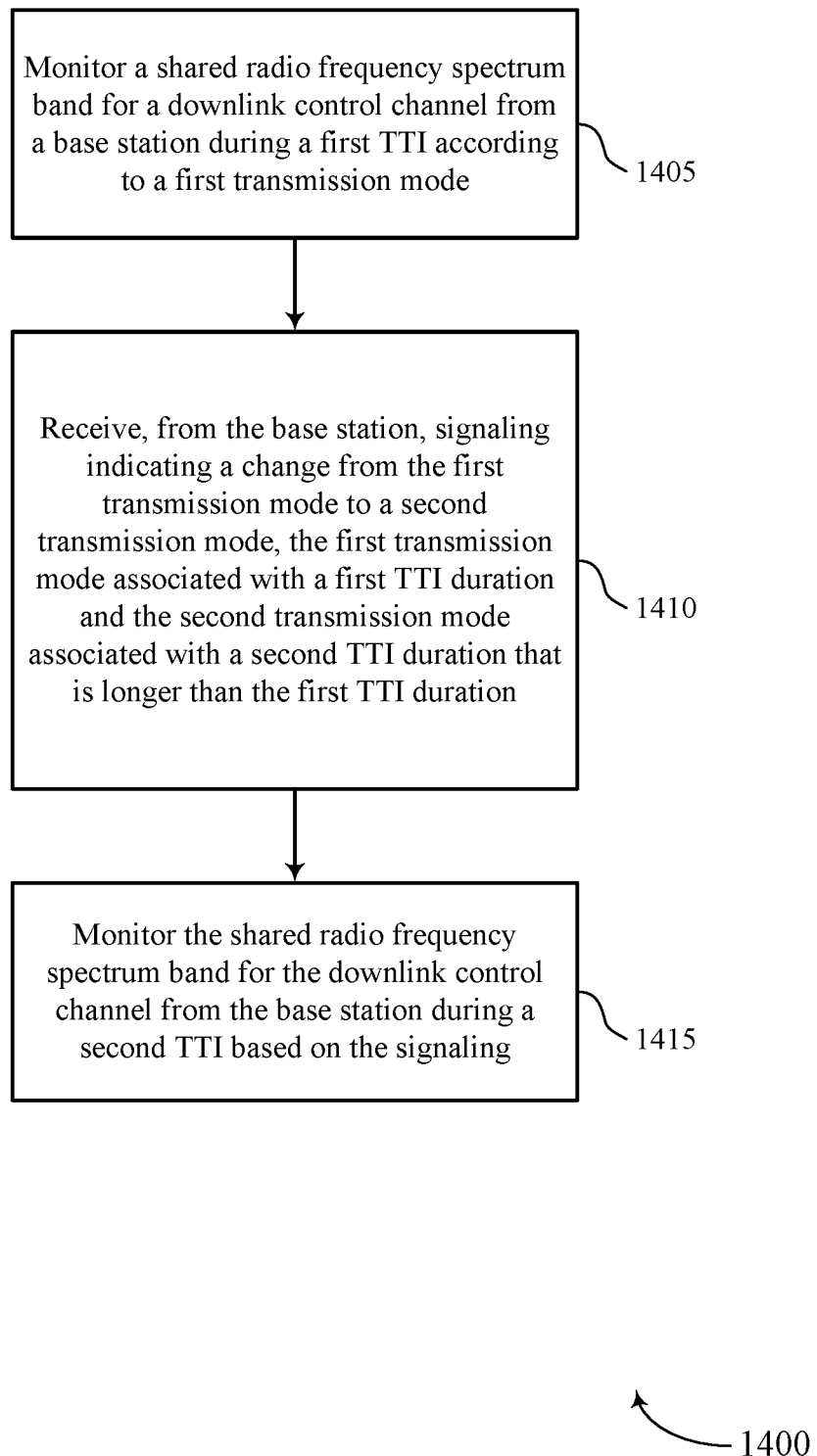
FIGS. 14 through 17 show flowcharts illustrating methods that support control channel design for shared wireless communications in accordance with aspects of the present disclosure.

FIG. 14 shows a flowchart illustrating a method 1400 that supports control channel design for shared wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may monitor a shared radio frequency spectrum band for a downlink control channel from a base station during a first TTI according to a first transmission mode. The operations of 1405 may be performed according to the methods described herein. In some examples, aspects of the operations of 1405 may be performed by a monitoring manager as described with reference to FIGS. 6 through 9.

At 1410, the UE may receive, from the base station, signaling indicating a change from the first transmission mode to a second transmission mode, the first transmission mode associated with a first TTI duration and the second transmission mode associated with a second TTI duration that is longer than the first TTI duration. The operations of 1410 may be performed according to the methods described herein. In some examples, aspects of the operations of 1410 may be performed by a mode change component as described with reference to FIGS. 6 through 9.

At 1415, the UE may monitor the shared radio frequency spectrum band for the downlink control channel from the base station during a second TTI based on the signaling. The operations of 1415 may be performed according to the methods described herein. In some examples, aspects of the operations of 1415 may be performed by a monitoring manager as described with reference to FIGS. 6 through 9.

Figure 15:
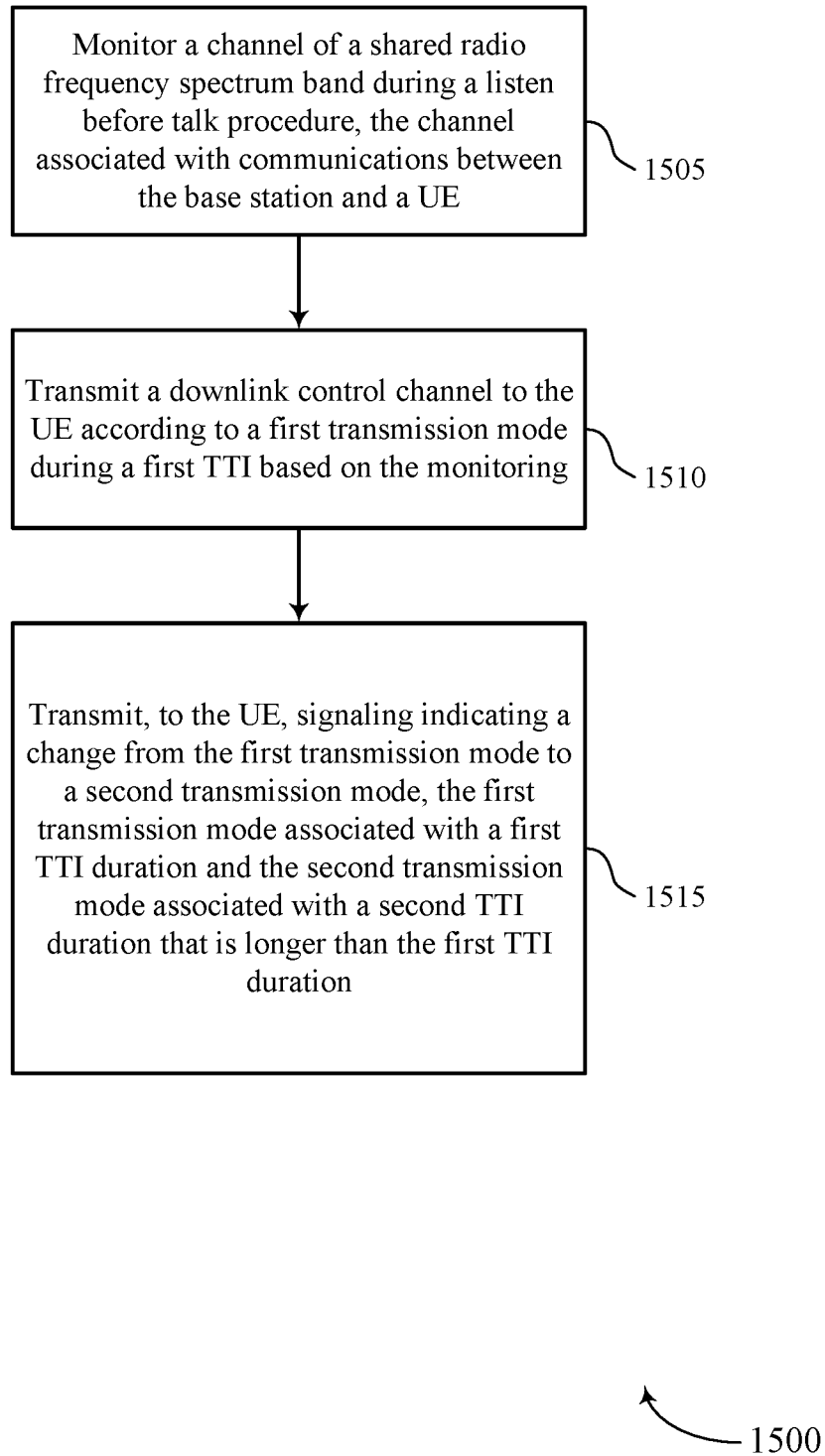

FIG. 15 shows a flowchart illustrating a method 1500 that supports control channel design for shared wireless communications in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may monitor a channel of a shared radio frequency spectrum band during an LBT procedure, the channel associated with communications between the base station and a UE. The operations of 1505 may be performed according to the methods described herein. In some examples, aspects of the operations of 1505 may be performed by a channel monitoring component as described with reference to FIGS. 10 through 13.

At 1510, the base station may transmit a downlink control channel to the UE according to a first transmission mode during a first TTI based on the monitoring. The operations of 1510 may be performed according to the methods described herein. In some examples, aspects of the operations of 1510 may be performed by a control channel transmitter as described with reference to FIGS. 10 through 13.

At 1515, the base station may transmit, to the UE, signaling indicating a change from the first transmission mode to a second transmission mode, the first transmission mode associated with a first TTI duration and the second transmission mode associated with a second TTI duration that is longer than the first TTI duration. The operations of 1515 may be performed according to the methods described herein. In some examples, aspects of the operations of 1515 may be performed by a mode change transmitter as described with reference to FIGS. 10 through 13.

Figure 16:
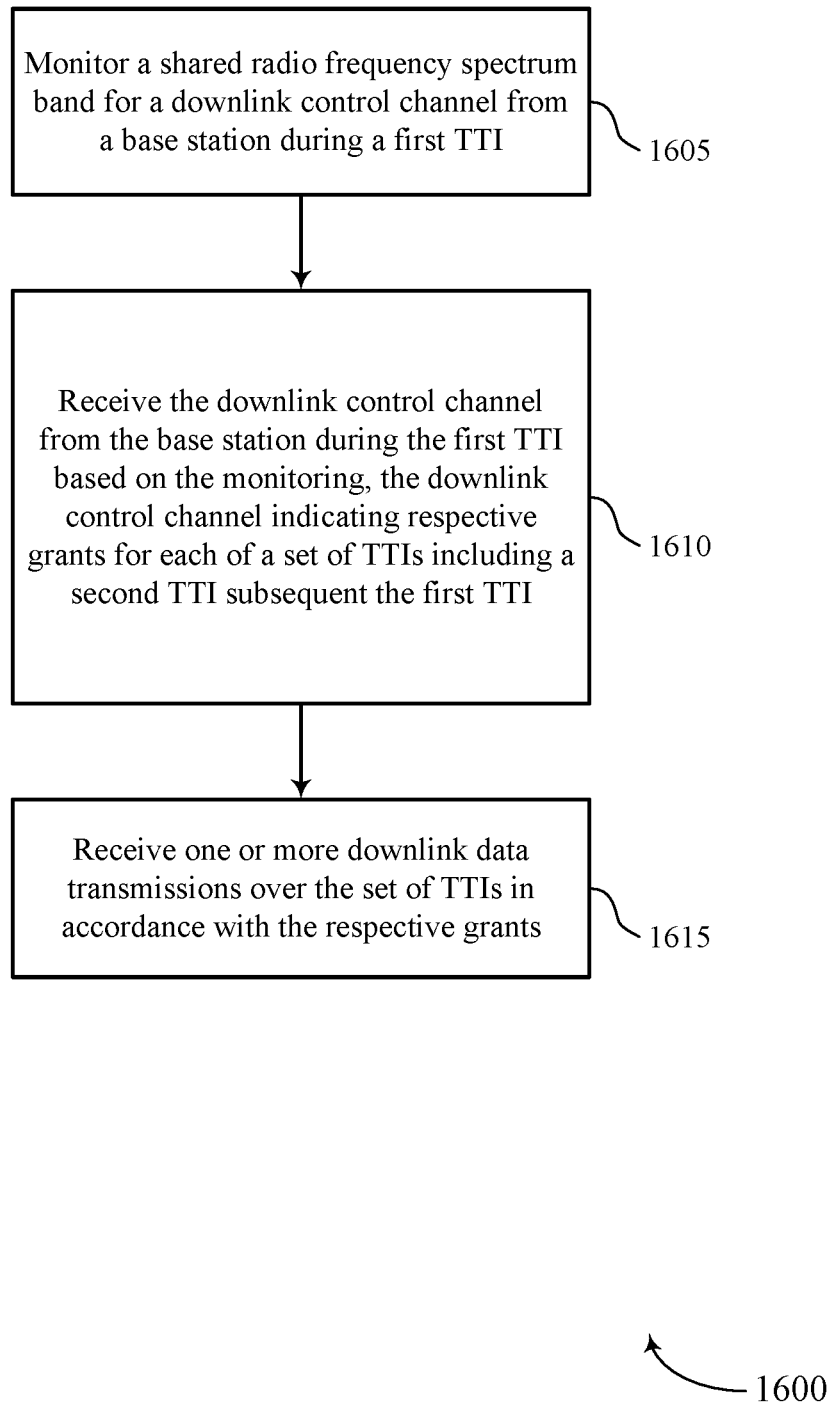

FIG. 16 shows a flowchart illustrating a method 1600 that supports control channel design for shared wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may monitor a shared radio frequency spectrum band for a downlink control channel from a base station during a first TTI. The operations of 1605 may be performed according to the methods described herein. In some examples, aspects of the operations of 1605 may be performed by a monitoring manager as described with reference to FIGS. 6 through 9.

At 1610, the UE may receive the downlink control channel from the base station during the first TTI based on the monitoring, the downlink control channel indicating respective grants for each of a set of TTIs including a second TTI subsequent the first TTI. The operations of 1610 may be performed according to the methods described herein. In some examples, aspects of the operations of 1610 may be performed by a downlink control receiver as described with reference to FIGS. 6 through 9.

At 1615, the UE may receive one or more downlink data transmissions over the set of TTIs in accordance with the respective grants. The operations of 1615 may be performed according to the methods described herein. In some examples, aspects of the operations of 1615 may be performed by a data receiver as described with reference to FIGS. 6 through 9.

Figure 17:
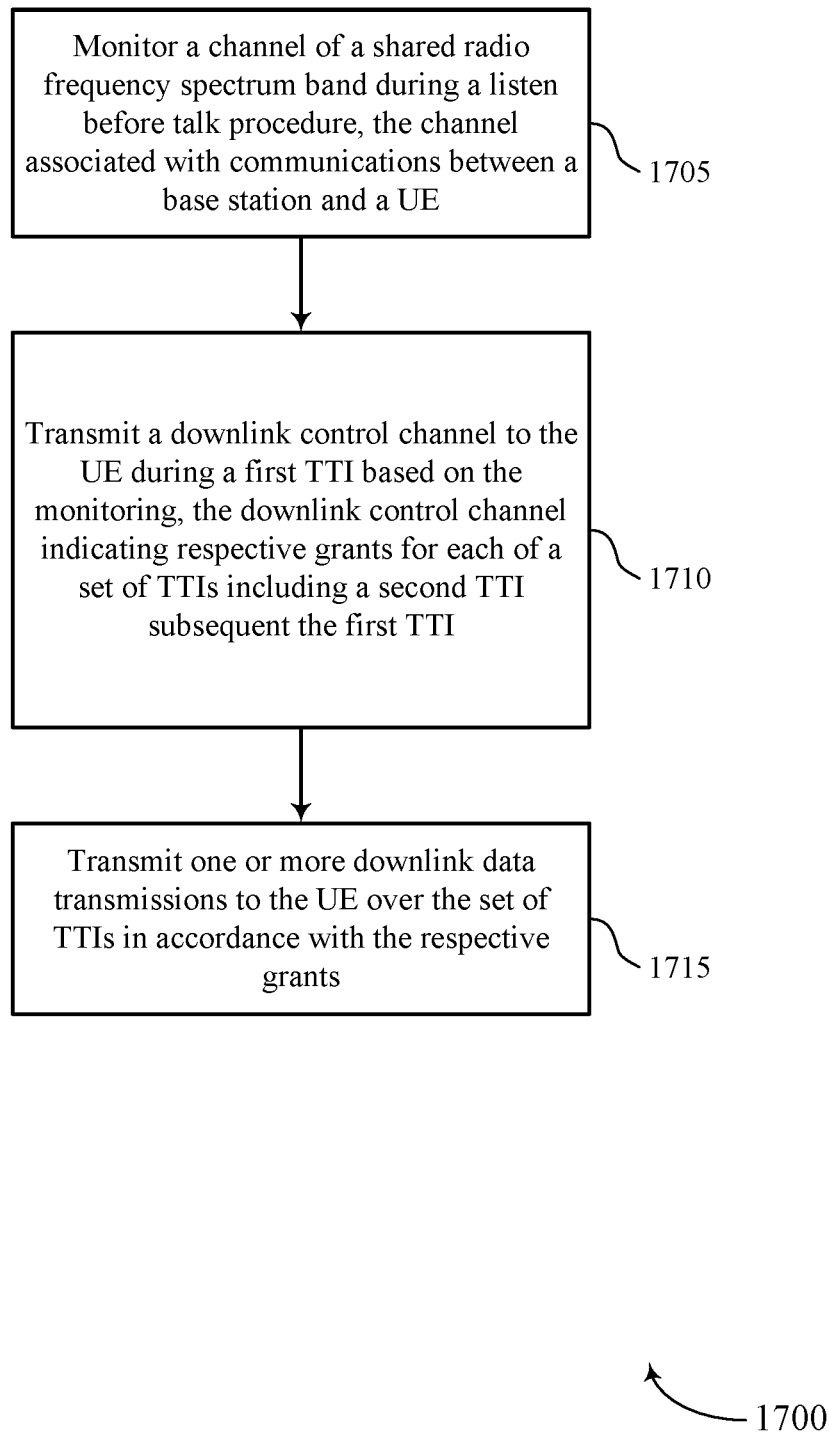

FIG. 17 shows a flowchart illustrating a method 1700 that supports control channel design for shared wireless communications in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may monitor a channel of a shared radio frequency spectrum band during an LBT procedure, the channel associated with communications between a base station and a UE. The operations of 1705 may be performed according to the methods described herein. In some examples, aspects of the operations of 1705 may be performed by a channel monitoring component as described with reference to FIGS. 10 through 13.

At 1710, the base station may transmit a downlink control channel to the UE during a first TTI based on the monitoring, the downlink control channel indicating respective grants for each of a set of TTIs including a second TTI subsequent the first TTI. The operations of 1710 may be performed according to the methods described herein. In some examples, aspects of the operations of 1710 may be performed by a control channel transmitter as described with reference to FIGS. 10 through 13.

At 1715, the base station may transmit one or more downlink data transmissions to the UE over the set of TTIs in accordance with the respective grants. The operations of 1715 may be performed according to the methods described herein. In some examples, aspects of the operations of 1715 may be performed by a data transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   monitoring, in accordance with a first control monitoring pattern, for a downlink control channel from a network device in each transmission time interval of a first plurality of transmission time intervals, each transmission time interval of the first plurality of transmission time intervals having a first duration, wherein the first control monitoring pattern is associated with a first number of blind decodes for the UE;
   receiving, from the network device while monitoring for the downlink control channel in accordance with the first control monitoring pattern, a physical downlink control channel comprising a switching indicator that indicates a switch from the first control monitoring pattern to a second control monitoring pattern that is different from the first control monitoring pattern and is associated with a second number of blind decodes for the UE, wherein the physical downlink control channel received while monitoring in accordance with the first control monitoring pattern indicates a number of another first plurality of transmission time intervals that is associated with the monitoring for the downlink control channel in accordance with the first control monitoring pattern before performing the switch;
   performing the switch from the first control monitoring pattern to the second control monitoring pattern after a time period based at least in part on the physical downlink control channel, wherein the time period corresponds to the number of the another first plurality of transmission time intervals; and
   monitoring, after performing the switch from the first control monitoring pattern to the second control monitoring pattern, for the downlink control channel from the network device in each transmission time interval of a second plurality of transmission time intervals in accordance with the second control monitoring pattern, each transmission time interval of the second plurality of transmission time intervals having a second duration that is different from the first duration.

2. The method of claim 1, further comprising:
   monitoring for the downlink control channel from the network device during a remaining portion of the first control monitoring pattern based at least in part on receiving the physical downlink control channel during a first portion of the first control monitoring pattern and the number of the another first plurality of transmission time intervals.

3. The method of claim 1, wherein the second control monitoring pattern comprises a beginning of communications according to a second transmission mode.

4. The method of claim 1, wherein the switching indicator indicates one or more of a beginning of communications according to the second control monitoring pattern or a continuation of communications according to the first control monitoring pattern.

5. The method of claim 1, further comprising:
   receiving a radio resource control (RRC) message from the network device, the RRC message comprising an indication of a fixed number of transmission time intervals for communications according to the first control monitoring pattern before the switch from the first control monitoring pattern to the second control monitoring pattern, wherein the number of the another first plurality of transmission time intervals that is associated with the monitoring for the downlink control channel in accordance with the first control monitoring pattern before performing the switch is based at least in part on the fixed number.

6. The method of claim 5, further comprising:
   receiving the physical downlink control channel from the network device before reaching an end of the fixed number of transmission time intervals; and
   restarting a timer comprising the fixed number of transmission time intervals for communications according to the first control monitoring pattern based at least in part on receiving the physical downlink control channel before reaching the end of the fixed number of transmission time intervals.

7. The method of claim 1, further comprising:
   identifying a maximum number of blind decodes for the downlink control channel and a maximum number of control channel elements (CCEs) for the downlink control channel, wherein the maximum number of blind decodes and the maximum number of CCEs are distributed among transmission time intervals of the first control monitoring pattern.

8. The method of claim 7, further comprising:
   receiving the downlink control channel according to the first control monitoring pattern based at least in part on a first subset of the maximum number of blind decodes and a first subset of the maximum number of CCEs; and
   receiving the downlink control channel according to the second control monitoring pattern based at least in part on a second subset of the maximum number of blind decodes and a second subset of the maximum number of CCEs.

9. The method of claim 1, wherein one or both of the first control monitoring pattern and the second control monitoring pattern indicates a periodicity for monitoring for the downlink control channel.

10. A method for wireless communications at a network device, comprising:
monitoring a channel during a listen before talk procedure, the channel associated with communications between the network device and a user equipment (UE);
transmitting, based at least in part on the monitoring and in accordance with a first control monitoring pattern, a downlink control channel to the UE in each transmission time interval of a first plurality of transmission time intervals, each transmission time interval of the first plurality of transmission time intervals having a first duration, wherein the first control monitoring pattern is associated with a first number of control channel elements (CCEs) for the UE;
transmitting, to the UE, in accordance with the first control monitoring pattern, a physical downlink control channel comprising a switching indicator that indicates a switch from the first control monitoring pattern to a second control monitoring pattern that is different from the first control monitoring pattern and is associated with a second number of CCEs, wherein the physical downlink control channel transmitted in accordance with the first control monitoring pattern indicates a number of another first plurality of transmission time intervals that is associated with the transmitting in accordance with the first control monitoring pattern before the switch;
determining a time period before the switch from the first control monitoring pattern to the second control monitoring pattern, wherein the time period corresponds to the number of the another first plurality of transmission time intervals that is associated with the transmitting in accordance with the first control monitoring pattern before the switch; and
transmitting, after the time period and in accordance with the second control monitoring pattern, the downlink control channel to the UE in each transmission time interval of a second plurality of transmission time intervals, each transmission time interval of the second plurality of transmission time intervals having a second duration that is different from the first duration.

11. The method of claim 10, wherein transmitting the downlink control channel further comprises: transmitting the downlink control channel during a remaining portion of the first control monitoring pattern based at least in part on transmitting the physical downlink control channel during a first portion of the first control monitoring pattern.

12. The method of claim 10, wherein the second control monitoring pattern is subsequent the first control monitoring pattern and comprises a beginning of communications according to a second transmission mode.

13. The method of claim 10, wherein the switching indicator indicates one or more of a beginning of communications according to the second control monitoring pattern or a continuation of communications according to the first control monitoring pattern.

14. The method of claim 10, further comprising:
transmitting a radio resource control (RRC) message to the UE, the RRC message indicating a fixed number of transmission time intervals for communications according to the first control monitoring pattern before the switch from the first control monitoring pattern to the second control monitoring pattern, wherein the number of the another first plurality of transmission time intervals that is associated with the transmitting in accordance with the first control monitoring pattern before the switch is based at least in part on the fixed number.

15. The method of claim 10, further comprising:
identifying a maximum number of CCEs for the downlink control channel, wherein the maximum number of CCEs are distributed among transmission time intervals of the first control monitoring pattern.

16. The method of claim 15, further comprising:
transmitting the downlink control channel according to the first control monitoring pattern based at least in part on a first subset of the maximum number of CCEs; and
transmitting the downlink control channel according to the second control monitoring pattern subsequent the first control monitoring pattern based at least in part on a second subset of the maximum number of CCEs.

17. An apparatus for wireless communications at a user equipment (UE), comprising:
a processor;
memory coupled with the processor; and
instructions stored in the memory and executable by the processor to cause the apparatus to:
monitor, in accordance with a first control monitoring pattern, for a downlink control channel from a network device in each transmission time interval of a first plurality of transmission time intervals, each transmission time interval of the first plurality of transmission time intervals having a first duration, wherein the first control monitoring pattern is associated with a first number of blind decodes for the UE;
receive, from the network device while monitoring for the downlink control channel in accordance with the first control monitoring pattern, a physical downlink control channel comprising a switching indicator that indicates a switch from the first control monitoring pattern to a second control monitoring pattern that is different from the first control monitoring pattern and is associated with a second number of blind decodes for the UE, wherein the physical downlink control channel received while monitoring in accordance with the first control monitoring pattern indicates a number of another first plurality of transmission time intervals that is associated with the monitoring for the downlink control channel in accordance with the first control monitoring pattern before performing the switch;
perform the switch from the first control monitoring pattern to the second control monitoring pattern after a time period based at least in part on the physical downlink control channel, wherein the time period corresponds to the number of the another first plurality of transmission time intervals; and
monitor, after performing the switch from the first control monitoring pattern to the second control monitoring pattern, for the downlink control channel from the network device in each transmission time interval of a second plurality of transmission time intervals in accordance with the second control monitoring pattern, each transmission time interval of the second plurality of transmission time intervals having a second duration that is different from the first duration.

18. The apparatus of claim 17, wherein the switching indicator indicates one or more of a beginning of communications according to the second control monitoring pattern or a continuation of communications according to the first control monitoring pattern.

19. The apparatus of claim 17, wherein one or both of the first control monitoring pattern and the second control monitoring pattern indicates a periodicity for monitoring for the downlink control channel.

20. The apparatus of claim 17, wherein the instructions are further executable by the apparatus to:
receive a radio resource control (RRC) message from the network device, the RRC message comprising an indication of a fixed number of transmission time intervals for communications according to the first control monitoring pattern before the switch from the first control monitoring pattern to the second control monitoring pattern, wherein the number of the another first plurality of transmission time intervals that is associated with the monitoring for the downlink control channel in accordance with the first control monitoring pattern before performing the switch is based at least in part on the fixed number.

21. An apparatus for wireless communications at a network device, comprising:
a processor;
memory coupled with the processor; and
instructions stored in the memory and executable by the processor to cause the apparatus to:
monitor a channel during a listen before talk procedure, the channel associated with communications between the network device and a user equipment (UE);
transmit, based at least in part on the monitoring and in accordance with a first control monitoring pattern, a downlink control channel to the UE in each transmission time interval of a first plurality of transmission time intervals, each transmission time interval of the first plurality of transmission time intervals having a first duration, wherein the first control monitoring pattern is associated with a first number of control channel elements (CCEs) for the UE;
transmit, to the UE, in accordance with the first control monitoring pattern, a physical downlink control channel comprising a switching indicator that indicates a switch from the first control monitoring pattern to a second control monitoring pattern that is different from the first control monitoring pattern and is associated with a second number of CCEs, wherein the physical downlink control channel transmitted in accordance with the first control monitoring pattern indicates a number of another first plurality of transmission time intervals that is associated with the transmitting in accordance with the first control monitoring pattern before the switch;
determine a time period before the switch from the first control monitoring pattern to the second control monitoring pattern, wherein the time period corresponds to the number of the another first plurality of transmission time intervals that is associated with the transmitting in accordance with the first control monitoring pattern before the switch; and
transmit, after the time period and in accordance with the second control monitoring pattern, the downlink control channel to the UE in each transmission time interval of a second plurality of transmission time intervals, each transmission time interval of the second plurality of transmission time intervals having a second duration that is different from the first duration.

22. The apparatus of claim 21, wherein the switching indicator indicates one or more of a beginning of communications according to the second control monitoring pattern or a continuation of communications according to the first control monitoring pattern.

23. The apparatus of claim 21, wherein one or both of the first control monitoring pattern and the second control monitoring pattern indicates a periodicity for monitoring for the downlink control channel.

24. The apparatus of claim 21, wherein the instructions are further executable by the apparatus to:
transmit, to the UE, a radio resource control (RRC) message comprising an indication of a fixed number of transmission time intervals for communications according to the first control monitoring pattern before the switch from the first control monitoring pattern to the second control monitoring pattern, wherein the number of the another first plurality of transmission time intervals that is associated with the monitoring for the downlink control channel in accordance with the first control monitoring pattern before performing the switch is based at least in part on the fixed number.

* * * * *